(12) United States Patent
Lee et al.

(10) Patent No.: US 9,106,291 B2
(45) Date of Patent: Aug. 11, 2015

(54) METHOD AND APPARATUS FOR CORRECTING ERRORS IN A MULTIPLE SUBCARRIERS COMMUNICATION SYSTEM USING MULTIPLE ANTENNAS

(71) Applicant: LG ELECTRONICS INC., Seoul (KR)

(72) Inventors: Moon Il Lee, Anyang-si (KR); Bin Chul Ihm, Anyang-si (KR); Jin Young Chun, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/141,308

(22) Filed: Dec. 26, 2013

(65) Prior Publication Data

US 2014/0105319 A1    Apr. 17, 2014

Related U.S. Application Data

(63) Continuation of application No. 13/652,406, filed on Oct. 15, 2012, now Pat. No. 8,645,782, which is a continuation of application No. 12/307,322, filed as application No. PCT/KR2007/003295 on Jul. 6, 2007, now Pat. No. 8,312,335.

(60) Provisional application No. 60/806,696, filed on Jul. 6, 2006.

(30) Foreign Application Priority Data

Sep. 20, 2006   (KR) .................. 10-2006-0091278

(51) Int. Cl.
  *G08C 25/02*   (2006.01)
  *H04B 7/04*   (2006.01)
  (Continued)

(52) U.S. Cl.
  CPC ............ *H04B 7/0456* (2013.01); *H04B 7/0417* (2013.01); *H04B 7/0639* (2013.01);
  (Continued)

(58) Field of Classification Search
  None
  See application file for complete search history.

(56) References Cited

U.S. PATENT DOCUMENTS 7,133,462 B2   11/2006   Ha et al.
7,447,967 B2   11/2008   Onggosanusi et al.
(Continued)

FOREIGN PATENT DOCUMENTS

EP    1545041    6/2005
EP    1667350    6/2006
(Continued)

OTHER PUBLICATIONS

Gidlund M, "Precoded closed-loop MIMO-OFDM system using predefined set of rotation matrices", Electronics Letters, IEEE Stevenage, GB, vol. 41, No. 5, Mar. 3, 2005, pp. 262-263, XP006023585.

(Continued)

*Primary Examiner* — Yolanda L Wilson
(74) *Attorney, Agent, or Firm* — Lee, Hong, Degerman, Kang & Waimey

(57) ABSTRACT

A method for correcting errors in a multiple antenna system based on a plurality of sub-carriers and a transmitting/receiving apparatus supporting the same are disclosed. The method includes determining a phase shift based precoding matrix phase shifted at a predetermined phase angle, initially transmitting each sub-carrier symbol to a receiver in a packet unit by using the phase shift based precoding matrix, reconstructing the phase shift based precoding matrix to reduce a spatial multiplexing rate if a negative reception acknowledgement (NACK) is received from the receiver, and retransmitting the initially transmitted sub-carrier symbol by using the reconstructed phase shift based precoding matrix or by changing the phase shift based precoding matrix using offset information fed back from the receiver or random offset information.

8 Claims, 18 Drawing Sheets

(51) Int. Cl.
  *H04B 7/06*   (2006.01)
  *H04L 1/00*   (2006.01)
  *H04L 1/06*   (2006.01)
  *H04L 1/18*   (2006.01)
  *H04L 27/26*  (2006.01)

(52) U.S. Cl.
  CPC ............ *H04B7/0656* (2013.01); *H04L 1/0025* (2013.01); *H04L 1/0625* (2013.01); *H04L 1/1893* (2013.01); *H04L 27/2601* (2013.01)

(56) References Cited

U.S. PATENT DOCUMENTS

| | | | |
|---|---|---|---|
| 7,944,894 B2* | 5/2011 | Ihm et al. | 370/336 |
| 2001/0001616 A1 | 5/2001 | Rakib et al. | |
| 2003/0072285 A1* | 4/2003 | Onggosanusi et al. | 370/335 |
| 2004/0082356 A1 | 4/2004 | Walton et al. | |
| 2006/0036922 A1* | 2/2006 | Hong et al. | 714/748 |
| 2006/0085717 A1 | 4/2006 | Tomaru et al. | |
| 2006/0107167 A1* | 5/2006 | Jeong et al. | 714/748 |
| 2008/0187136 A1 | 8/2008 | Zhang et al. | |
| 2009/0307558 A1 | 12/2009 | Lee et al. | |
| 2010/0034165 A1* | 2/2010 | Han et al. | 370/330 |
| 2013/0034182 A1 | 2/2013 | Lee et al. | |

FOREIGN PATENT DOCUMENTS

| | | |
|---|---|---|
| JP | 2003244045 | 8/2003 |
| JP | 2004214913 | 7/2004 |
| JP | 2006067237 | 3/2006 |
| JP | 2006128853 | 5/2006 |
| JP | 2007306423 | 11/2007 |
| JP | 2009538555 | 11/2009 |
| JP | 2009538556 | 11/2009 |
| WO | 2005025117 | 3/2005 |
| WO | 2005/099211 | 10/2005 |
| WO | 2006/019253 | 2/2006 |
| WO | 2006035637 | 4/2006 |
| WO | 2006/068305 | 6/2006 |
| WO | 2006070465 | 7/2006 |
| WO | 2006075453 | 7/2006 |
| WO | 2006129749 | 12/2006 |

OTHER PUBLICATIONS

European Patent Office Application Serial No. 07768639.2, Search Report dated Jan. 2, 2013, 8 pages.

* cited by examiner

METHOD AND APPARATUS FOR CORRECTING ERRORS IN A MULTIPLE SUBCARRIERS COMMUNICATION SYSTEM USING MULTIPLE ANTENNAS

CROSS-REFERENCE TO RELATED APPLICATIONS

This application is a continuation of U.S. application Ser. No. 13/652,406, filed on Oct. 15, 2012, now U.S. Pat. No. 8,645,782, which is a continuation of U.S. application Ser. No. 12/307,322, filed on Jul. 10, 2009, now U.S. Pat. No. 8,312,335, which is the National Stage filing under 35 U.S.C. §371 of International Application No. PCT/KR2007/003295, filed on Jul. 6, 2007, which claims the benefit of earlier filing date and right of priority to Korean Application No. 10-2006-0091278, filed on Sep. 20, 2006, and also claims the benefit of U.S. Provisional Application Ser. No. 60/806,696, filed on Jul. 6, 2006, the contents of which are all hereby incorporated by reference herein in their entireties.

TECHNICAL FIELD

The present invention relates to a method for correcting errors in a multiple antenna system based on a plurality of sub-carriers to perform an automatic repeat request scheme, and a transmitting and receiving apparatus supporting the same.

BACKGROUND ART

Recently, as information communication services have been popularized, a variety of multimedia services has appeared, and high-quality services have appeared, a demand for a wireless communication service is rapidly increasing. In order to actively cope with such a tendency, it is necessary to increase capacity of a communication system and improve reliability in data transmission. A method of increasing communication capacity in a wireless communication environment may include a method of finding a new available frequency band and a method of increasing the efficiency of a restricted resource. As the latter method, multiple-antenna transmission/reception technologies of mounting a plurality of antennas in a transceiver to additionally ensure a space for using a resource, thereby obtaining a diversity gain or transmitting data via each of the antennas in parallel to increase transmission capacity are attracting much attention and are being actively developed.

Among the multiple-antenna transmission/reception technologies, a general structure of a multiple-input multiple-output (MIMO) system based on an orthogonal frequency division multiplexing (OFDM) will now be described with reference to FIG. 1.

In a transmitter, a channel encoder 101 adds redundant bits to transmission data bits to reduce influence due to a channel or noise, a mapper 103 converts data bit information into data symbol information, a serial-to-parallel converter 105 converts data symbols into parallel data symbols to be carried in a plurality of sub-carriers, and a multiple-antenna encoder 107 converts the parallel data symbols into space-time signals. A multiple-antenna decoder 109, a parallel-to-serial converter 111, a demapper 113, and a channel decoder 115, which are included in a receiver, perform the inverse functions of the multiple-antenna encoder 107, the serial/parallel converter 105, the mapper 103, and the channel encoder 101, respectively.

In a multiple-antenna OFMD system, a variety of technologies of increasing reliability in data transmission are required. Examples of the technologies include space-time code (STC), cyclic delay diversity (CDD), antenna selection (AS), antenna hopping (AH), spatial multiplexing (SM), beamforming (BF), and precoding. Hereinafter, main technologies will be described in more detail.

The STC is a scheme for obtaining the spatial diversity gain by successively transmitting same signals through different antennas in a multiple antenna environment. The following determinant represents a basic time-space symbol used in a system having two transmitting antennas.

$$\frac{1}{\sqrt{2}} \begin{pmatrix} S_1 & -S_2^* \\ S_2 & S_1^* \end{pmatrix}$$

In the above determinant, row represents antennas and column represents time slots.

The cyclic delay diversity (CDD) is to obtain a frequency diversity gain at a receiver by allowing all antennas to transmit OFDM signals at different delay values or different sizes when a system having a plurality of transmitting antennas transmits the OFDM signals. FIG. 2 illustrates a transmitter of a multiple antenna system which uses a cyclic delay diversity (CDD) scheme.

After the OFDM symbols are separately transmitted to each of the antennas through a serial-to-parallel converter and a multiple antenna encoder, they are added with a cyclic prefix (CP) for preventing interchannel interference and then transmitted to the receiver. At this time, a data sequence transmitted to the first antenna is transmitted to the receiver as it is but a data sequence transmitted to the next antenna is cyclic-delayed by a certain bit and then transmitted to the receiver.

Meanwhile, if the aforementioned cyclic delay diversity scheme is implemented in a frequency domain, the cyclic delay can be expressed by the product of phase sequences. In other words, as shown in FIG. 3, data sequences in the frequency domain are multiplied by predetermined different phase sequences (phase sequence 1 to phase sequence M) which are differently set according to the antennas, and are subjected to an inverse fast Fourier transform (IFFT), thereby being transmitted to the receiver. This is called a phase shift diversity scheme.

According to the phase shift diversity scheme, a flat fading channel can be changed to a frequency selective channel, and frequency diversity gain or frequency scheduling gain can be obtained through channel coding. In other words, as shown in FIG. 4, if a phase sequence is generated using cyclic delay of a great value in the phase shift diversity scheme, since a frequency selective period becomes short, frequency selectivity becomes high, and after all, the frequency diversity gain can be obtained through channel coding. This is mainly used in an open loop system.

Also, if a phase sequence is generated using cyclic delay of a small value in the phase shift diversity scheme, since a frequency selective period becomes long, a closed loop system allocates a resource to the most excellent channel area to obtain a frequency scheduling gain. In other words, as shown in FIG. 4, if a phase sequence is generated using cyclic delay of a small value in the phase shift diversity scheme, a certain sub-carrier area of a flat fading channel has a great channel size and other sub-carrier areas have a small channel size. In this case, if an orthogonal frequency division multiple access (OFDMA) system which allows a plurality of users transmits a signal through sub-carrier having a great channel size for each user, a signal to noise ratio (SNR) may increase.

Meanwhile, the precoding scheme includes a codebook based precoding scheme which is used when feedback information is finite in a closed loop system and a scheme for quantizing and feeding back channel information. In the codebook based precoding scheme, an index of a precoding matrix which is previously known to a transmitter/receiver is fed back to the transmitter to obtain SNR gain.

FIG. 5 illustrates the configuration of a transmitter/receiver of a multiple antenna system which uses the codebook based precoding scheme. The transmitter and the receiver have finite precoding matrixes $P_1$ to $P_L$. The receiver feeds back an optimal precoding matrix index l to the transmitter by using channel information, and the transmitter applies a precoding matrix corresponding to the fed-back index to transmission data $X_1$ to $X_{Mt}$. Table 1 illustrates an example of the codebook which is applicable when 3-bit feedback information is used in an IEEE 802.16e system which supports a spatial multiplexing rate of 2 and has two transmission antennas.

TABLE 1

| Matrix index (binary) | Column1 | Column2 |
|---|---|---|
| 000 | 1 | 0 |
|  | 0 | 1 |
| 001 | 0.7940 | −0.5801 − j0.1818 |
|  | −0.5801 + j0.1818 | −0.7940 |
| 010 | 0.7940 | 0.0576 − j0.6051 |
|  | 0.0576 + j0.6051 | −0.7940 |
| 011 | 0.7941 | −0.2978 + j0.5298 |
|  | −0.2978 − j0.5298 | −0.7941 |
| 100 | 0.7941 | 0.6038 − j0.0689 |
|  | 0.6038 + j0.0689 | −0.7941 |
| 101 | 0.3289 | 0.6614 − j0.6740 |
|  | 0.6614 + j0.6740 | −0.3289 |
| 110 | 0.5112 | 0.4754 + j0.7160 |
|  | 0.4754 − j0.7160 | −0.5112 |
| 111 | 0.3289 | −0.8779 + j0.3481 |
|  | −0.8779 − j0.3481 | −0.3289 |

Meanwhile, examples of improving reliability in data transmission in a wireless communication environment include an Automatic Repeat reQuest (ARQ) scheme and a hybrid ARQ (HARQ) scheme. These schemes will now be described in detail.

An orthogonal frequency division multiplexing (OFDM) system and its similar system define resource blocks defined in a time-frequency domain and use the resource blocks as a single unit. In a downlink, a base station allocates at least one resource block to a specific user equipment in accordance with a given scheduling rule and transmits data through a corresponding resource block. Also, in an uplink, if the base station selects a specific user equipment in accordance with a given scheduling rule and allocates a resource block to the corresponding user equipment, the corresponding user equipment transmits data to the base station through the allocated resource block. At this time, if frame loss or damage occurs in the data transmitted to the downlink or the uplink, the ARQ or the HARQ is used to correct corresponding errors.

Examples of the HARQ scheme include channel-adaptive HARQ/channel-non-adaptive HARQ and chase combining scheme/incremental redundancy scheme. In the channel-non-adaptive HARQ, frame modulation or the number of available resource blocks for retransmission is performed as it is determined during initial transmission. The channel-adaptive HARQ varies the above parameters depending on the current channel status. For example, according to the channel-non-adaptive HARQ, if a transmitting side transmits data by using eight resource blocks in case of initial transmission, the transmitting side retransmits the data by using eight resource blocks even in case of retransmission. According to the channel-adaptive HARQ, even though the transmitting side transmits data by using eight resource blocks in case of initial transmission, the transmitting side retransmits the data by using resource blocks more than or less than eight resource blocks depending on the channel status.

Furthermore, the HARQ scheme can be classified into a chase combining scheme and an incremental redundancy scheme depending on which packet is transmitted during retransmission. According to the chase combining scheme, as shown in FIG. 6, the transmitting side retransmits a packet having the same format as that used for initial transmission or same data symbols in different formats during second or third transmission if errors occur in the packet used for the initial transmission. The HARQ scheme is similar to the ARQ scheme in that the receiving side transmits NCK message to the transmitting side if the receiving side cannot demodulate a packet. However, the HARQ scheme is different from the ARQ scheme in that the receiving side stores a frame which is previously received in a buffer for a certain time period and if a corresponding frame is retransmitted, combines the retransmitted frame with the previously received frame to improve a receiving success rate. The incremental redundancy scheme is different from the chase combining scheme in that a packet having a format different from that of the packet used for initial transmission can be retransmitted. In other words, as shown in FIG. 7, additional parity part of a channel code is only retransmitted during the second or third retransmission to reduce a channel coding rate, thereby correcting packet errors.

In addition, the HARQ scheme can be classified into synchronous HARQ and asynchronous HARQ depending on whether retransmission performed after transmission failure of initial data is performed in accordance with a given timing.

Since the aforementioned multiple antenna related scheme and the ARQ related schemes have been developed independently, synergy effect according to combination of the schemes have not been obtained. In this regard, a time-space symbol based HARQ has been suggested. The time-space symbol based HARQ is used in a multiple antenna system. According to the time-space symbol based HARQ, as shown in FIG. 8, a data transmission rate increases through a bell labs layered space time (BLAST) scheme during initial transmission, and if errors occur in symbols S1 and S2 of a specific time slot, a time-space symbol is applied to the symbols of the corresponding time slot and then retransmission is performed to improve transmission reliability.

However, the aforementioned time-space symbol based HARQ has several problems. First, the time-space symbol based HARQ has limitation in that it is based on a flat fading channel whose change speed is relatively slow. Second, if multiple codewords are used, it is inefficient in that retransmission of all codewords is required even though errors occur only in some of the codewords. Third, flexibility is deteriorated in that initial transmission should be performed by a spatial multiplexing scheme such as BLAST. Finally, since the adaptive ARQ such as incremental redundancy cannot be used for the time-space based HARQ, efficient error correction cannot be performed.

DISCLOSURE OF THE INVENTION

Accordingly, the present invention is directed to a method for correcting errors in a multiple antenna system based on a plurality of sub-carriers and a transmitting/receiving apparatus supporting the same, which substantially obviate one or more problems due to limitations and disadvantages of the related art.

An object of the present invention is to provide a method for correcting errors in a multiple antenna system based on a plurality of sub-carriers and a transmitting/receiving apparatus supporting the same, in which a multiple antenna related scheme is combined with an automatic repeat request scheme to simultaneously improve speed and reliability in data transmission.

To achieve these objects and other advantages and in accordance with the purpose of the invention, as embodied and broadly described herein, a method for correcting errors in a multiple antenna system based on a plurality of sub-carriers includes determining a phase shift based precoding matrix phase shifted at a predetermined phase angle, initially transmitting each sub-carrier symbol to a receiver in a packet unit by using the phase shift based precoding matrix, reconstructing the phase shift based precoding matrix to reduce a spatial multiplexing rate if a negative reception acknowledgement (NACK) is received from the receiver, and retransmitting the initially transmitted sub-carrier symbol by using the reconstructed phase shift based precoding matrix. The method may further include applying offset information fed back from the receiver to the precoding matrix.

In another aspect of the present invention, a transmitting and receiving apparatus which supports a method for correcting errors in a multiple antenna system based on a plurality of sub-carriers includes a precoding matrix determination module determining a precoding matrix phase shifted at a predetermined phase angle, a precoding matrix reconstruction module the precoding matrix to reduce a spatial multiplexing rate if a negative reception acknowledgement (NACK) is received from a receiver, and a precoding module precoding each sub-carrier symbol through the precoding matrix. The transmitting and receiving apparatus may further include an offset application module applying offset information fed back from the receiver to the precoding matrix.

In the above aspects, the number of columns corresponding to the reduced spatial multiplexing rate is selected from the determined phase shift based precoding matrix so that the precoding matrix is reconstructed to consist of the selected columns only.

Furthermore, if errors occur only in some of the initially transmitted packets, the retransmitting step includes retransmitting some packets where errors occur but does not transmit a new packet until retransmission is completed. Also, the retransmitting step may include retransmitting some packets where errors occur and transmit a new packet. In both cases, the retransmitting step is performed through antennas other than those through which the packets where errors occur are transmitted. Also, the retransmitting step may include selecting antennas having excellent channel status.

Furthermore, the initial transmitting step includes transmitting different sub-carrier symbols to each antenna, and if errors occur in all of the initially transmitted packets, the retransmitting step is performed to allow sub-carrier symbols of each antenna to have orthogonality.

In still another aspect of the present invention, a method for correcting errors in a multiple antenna system based on a plurality of sub-carriers includes determining a phase shift based precoding matrix phase shifted at a predetermined phase angle, initially transmitting each sub-carrier symbol to a receiver in a packet unit by using the phase shift based precoding matrix, applying predetermined offset information to the precoding matrix if a negative reception acknowledgement (NACK) is received from the receiver, and retransmitting the initially transmitted sub-carrier symbol by using the phase shift based precoding matrix to which the offset information has been applied.

In further still another aspect of the present invention, a transmitting and receiving apparatus which supports a method for correcting errors in a multiple antenna system based on a plurality of sub-carriers includes a precoding matrix determination module determining a precoding matrix phase shifted at a predetermined phase angle, an offset application module applying offset information fed back from the receiver to the precoding matrix, and a precoding module precoding each sub-carrier symbol through the precoding matrix.

The offset information includes at least one of sub-carrier index offset information and phase value offset information, or both of them. Also, the offset information is sub-carrier index offset information applied to all sub-carriers, and the sub-carrier offset information is a fixed value.

BEST MODE FOR CARRYING OUT THE INVENTION

Figure 1:
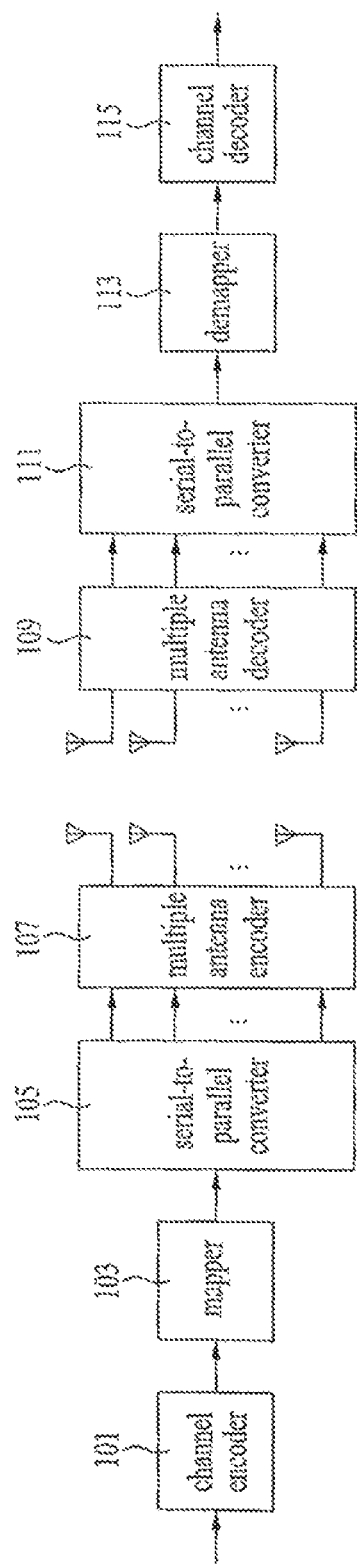
FIG. 1 is a block diagram illustrating an orthogonal frequency division multiplexing system having multiple transmitting/receiving antennas.
Figure 2:
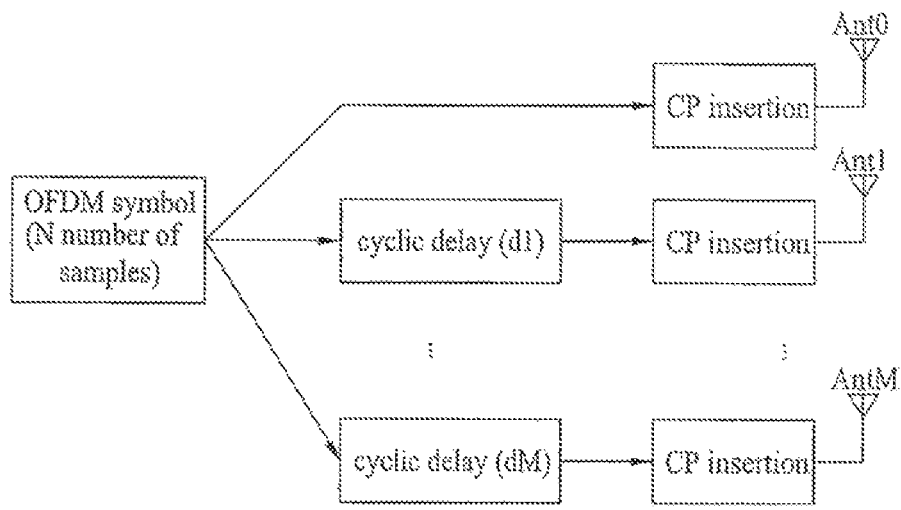
FIG. 2 is a schematic view illustrating a transmitter of a multiple antenna system based on a related art cyclic delay diversity scheme.
Figure 3:
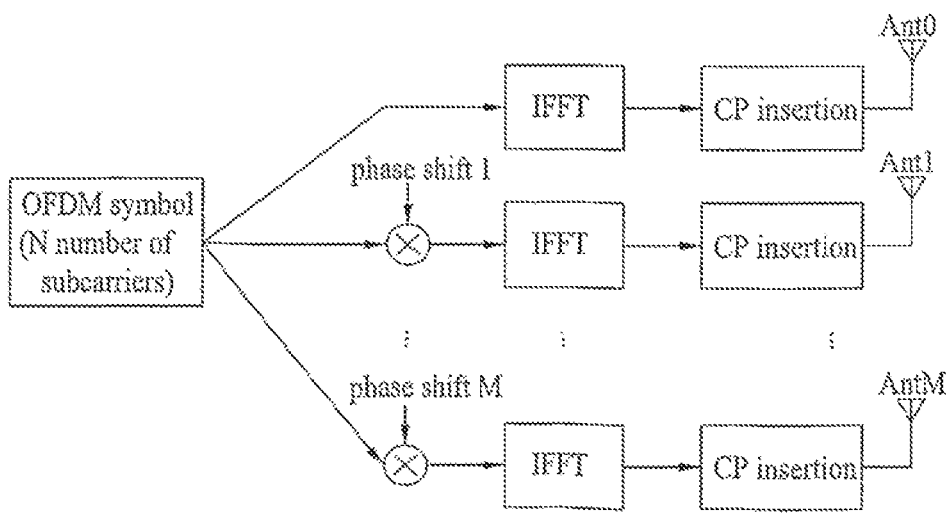
FIG. 3 is a schematic view illustrating a transmitter of a multiple antenna system based on a related art phase shift diversity scheme.
Figure 4:
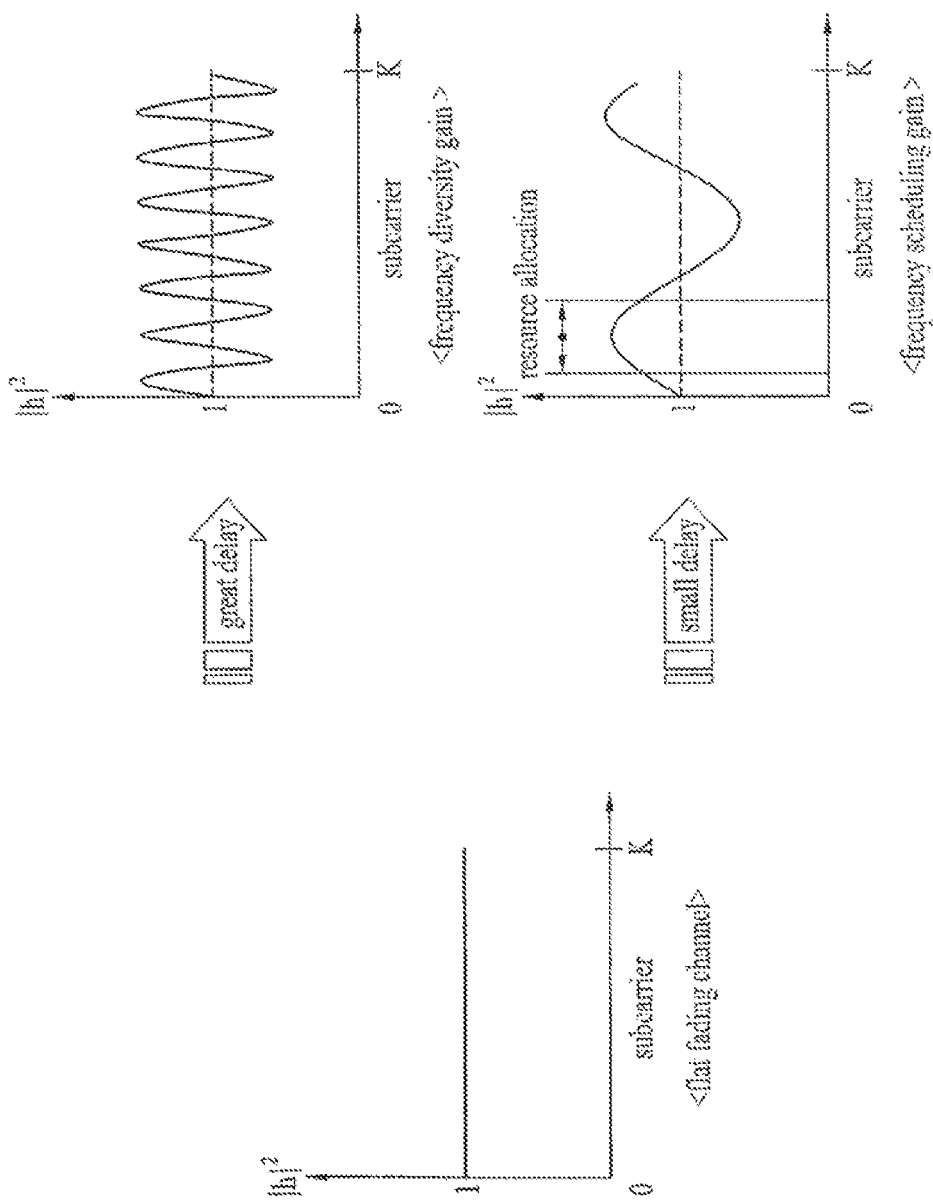
FIG. 4 illustrates graphs of two examples of a related art phase shift diversity scheme.
Figure 5:
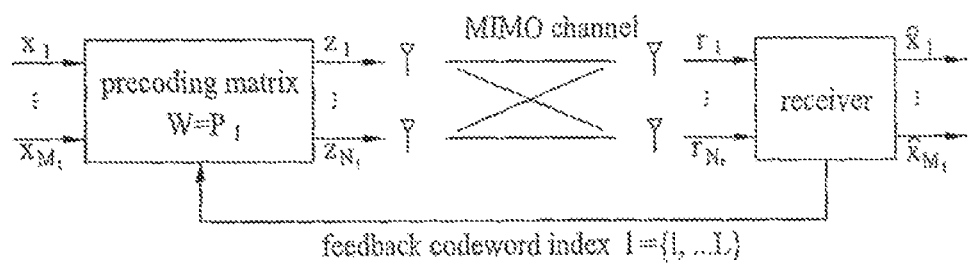
FIG. 5 is a schematic view illustrating a transmitter/receiver of a multiple antenna system based on a related art precoding scheme.
Figure 6:
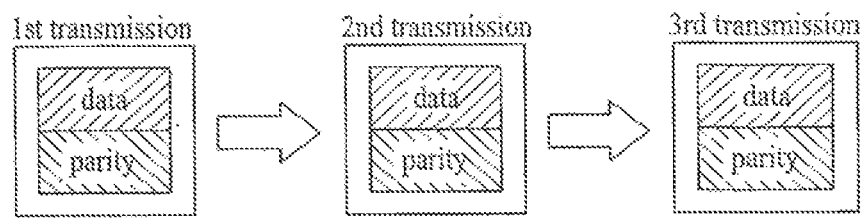
FIG. 6 illustrates a concept of a chase combining scheme of HARQ.
Figure 7:
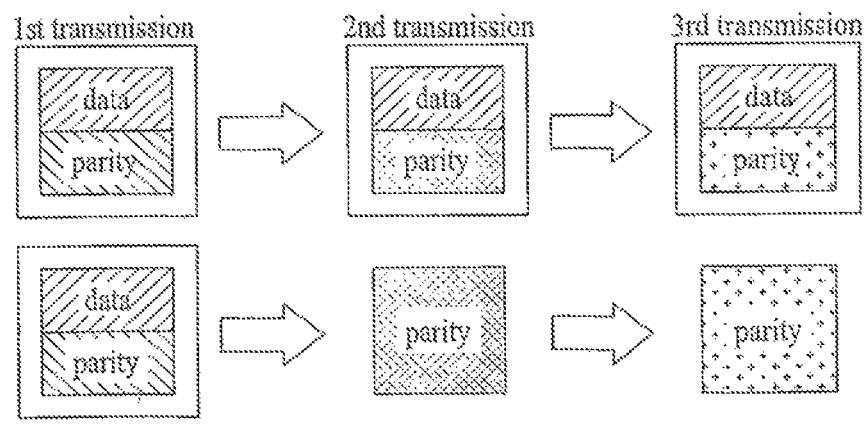
FIG. 7 illustrates a concept of an incremental redundancy scheme of HARQ.

Reference will now be made in detail to the preferred embodiments of the present invention, examples of which are illustrated in the accompanying drawings.

The present invention relates to a method for correcting errors in a multiple antenna system and a transmitting/receiving apparatus supporting the same, which can be applied to a frequency selective channel whose change is frequent in addition to a flat fading channel, can be applied to both a single codeword structure and a multi codeword structure, and to which adaptive ARQ can be applied. To this end, in the present invention, a phase shift based precoding scheme is used, which can reconstruct or change a precoding matrix depending a spatial multiplexing rate and various kinds of offset information, and if NACK signal is arrived from a receiver due to transmission errors, there are suggested a first method of performing retransmission after reconstructing a precoding matrix to reduce the spatial multiplexing rate and a second method of performing retransmission after changing a precoding matrix by using predetermined offset information fed back from a receiver.

First Embodiment

As described above, cyclic delay diversity or phase shift diversity is advantageous in that it can be applied to both an open loop system and a closed loop system depending on a cyclic delay value and can simply be implemented. However, a problem occurs in that a data transmission rate is reduced due to a spatial multiplexing rate of 1. Also, although codebook based precoding is advantageous in that efficient data transmission can be performed by feedback of index, problems occur in that the codebook based precoding is not suitable for a mobile environment in which channel change is frequent and that memory use increases as a codebook should be provided at both sides of a transmitter/receiver. Accordingly, the present invention suggests a phase shift based precoding method, which can easily change precoding matrixes depending on circumstances and has advantages of phase shift diversity and precoding, and a method for correcting errors, which includes ARQ scheme.

Hereinafter, the phase shift based precoding method and the ARQ scheme of the first method based on the phase shift based precoding method will be described. Subsequently, a transmitting/receiving apparatus which supports the ARQ scheme of the first method will be described.

Phase Shift Based Precoding Method

A phase shift based precoding matrix P suggested in the present invention may be generalized and expressed as follows.

$$P_{N_t \times R}^k = \begin{pmatrix} w_{1,1}^k & w_{1,2}^k & \cdots & w_{1,R}^k \\ w_{2,1}^k & w_{2,2}^k & \cdots & w_{2,R}^k \\ \vdots & \vdots & \ddots & \vdots \\ w_{N_t,1}^k & w_{N_t,2}^k & \cdots & w_{N_t,R}^k \end{pmatrix} \quad \text{[Equation 1]}$$

where, $w_{ij}^k$ (i=1, ..., $N_t$, j=1, ..., R) denotes a complex weighted value determined by a sub-carrier index k, $N_t$ denotes the number of transmitting antennas or virtual antennas (value equal to a spatial multiplexing rate, $N_t$=R), and R denotes a spatial multiplexing rate. The complex weighted value may vary depending on OFDM symbols which are multiplied by the antennas and the index of the corresponding sub-carrier.

Meanwhile, the precoding matrix P of Equation 1 is preferably designed by a unitary matrix in order to reduce the loss of channel capacity in a multiple antenna system. In order to check a condition for configuring the unitary matrix, the channel capacity of the multiple antenna system is expressed by Equation 2.

$$Cu(H) = \log_2\left(\det\left(I_{N_r} + \frac{SNR}{N}HH^H\right)\right) \quad \text{[Equation 2]}$$

where, H denotes an $N_r \times N_t$ sized multiple antenna channel matrix and $N_r$ denotes the number of receiving antennas. Equation 3 is obtained by applying the phase shift based precoding matrix P to Equation 2.

$$C_{precoding} = \log_2\left(\det\left(I_{N_r} + \frac{SNR}{N}HPP^H H^H\right)\right) \quad \text{[Equation 3]}$$

As can be seen from Equation 3, in order to eliminate the loss of the channel capacity, $PP^H$ should become an identity matrix. Accordingly, the phase shift based precoding matrix P should satisfy Equation 4.

$$PP^H = I_N \quad \text{[Equation 4]}$$

In order to allow the phase shift based precoding matrix P to become the unitary matrix, two types of conditions, that is, a power constraint condition and an orthogonality constraint condition, should be satisfied simultaneously. The power constraint condition allows the level of each column of the matrix to become 1, and the orthogonality constraint condition allows the respective columns of the matrix to have orthogonal characteristics. These are respectively expressed by Equations 5 and 6.

$$|w_{1,1}^k|^2 + |w_{2,1}^k|^2 + \Lambda + |w_{N_t,1}^k|^2 = 1,$$
$$|w_{1,2}^k|^2 + |w_{2,2}^k|^2 + \Lambda + |w_{N_t,2}^k|^2 = 1,$$
$$M$$
$$|w_{1,R}^k|^2 + |w_{2,R}^k|^2 + \Lambda + |w_{N_t,R}^k|^2 = 1$$ [Equation 5]

$$w_{1,1}^{k*} w_{1,2}^k + w_{2,1}^{k*} w_{2,2}^k + \ldots + w_{N,1}^{k*} w_{N,2}^k = 0,$$
$$w_{1,1}^{k*} w_{1,3}^k + w_{2,1}^{k*} w_{2,3}^k + \ldots + w_{N,1}^{k*} w_{N,3}^k = 0,$$
$$\vdots$$
$$w_{1,1}^{k*} w_{1,R}^k + w_{2,1}^{k*} w_{2,R}^k + \ldots + w_{N,1}^{k*} w_{N,R}^k = 0$$ [Equation 6]

Next, an example of the generalized equation of a 2×2 phase shift based precoding matrix is provided, and equations for satisfying the two constraint conditions are obtained as follows. Equation 7 shows a generalized equation of a phase shift based precoding matrix when the number of transmitting antennas is 2 and a spatial multiplexing rate is 2.

$$P_{2\times 2}^k = \begin{pmatrix} \alpha_1 e^{jk\theta_1} & \beta_1 e^{jk\theta_2} \\ \beta_2 e^{jk\theta_3} & \alpha_2 e^{jk\theta_4} \end{pmatrix}$$ [Equation 7]

where, $\alpha_i$ and $\beta_i$ (i=1, 2) are real numbers, $\theta_i$ (i=1, 2, 3, 4) denotes a phase value, and k denotes a sub-carrier index of an OFDM signal. In order to implement the precoding matrix with the unitary matrix, the power constraint condition of Equation 8 and the orthogonality constraint condition of Equation 9 should be satisfied.

$$|\alpha_1 e^{jk\theta_1}|^2 + |\beta_2 e^{jk\theta_3}|^2 = 1, |\alpha_2 e^{jk\theta_4}|^2 + |\beta_1 e^{jk\theta_2}|^2 = 1$$ [Equation 8]

$$(\alpha_1 e^{jk\theta_1})^* \beta_1 e^{jk\theta_2} + (\beta_2 e^{jk\theta_3})^* \alpha_2 e^{jk\theta_4} = 0$$ [Equation 9]

where, a mark * denotes a conjugate complex number. An example of a 2×2 phase shift based precoding matrix which satisfies Equations 7 to 9 is as follows.

$$P_{2\times 2}^k = \frac{1}{\sqrt{2}} \begin{pmatrix} 1 & e^{jk\theta_2} \\ e^{jk\theta_3} & 1 \end{pmatrix}$$ [Equation 10]

where, $\theta_2$ and $\theta_3$ have a relationship expressed by Equation 11 according to the orthogonality constraint.

$$k\theta_3 = -k\theta_2 + \pi$$ [Equation 11]

The precoding matrix may be stored in the memories of the transmitter and the receiver in a codebook form, and the codebook may include a variety of precoding matrixes generated using different finite values $\theta_2$. The values $\theta_2$ may properly be set depending on the channel status and the presence of the feedback information. If the feedback information is used, the values $\theta_2$ are set to small values, and, if the feedback information is not used, the values $\theta_2$ are set to large values, whereby a high frequency diversity gain can be obtained.

Meanwhile, the spatial multiplexing rate may be set to be smaller than the number of antennas depending on the channel status even though the phase shift based precoding matrix is generated as shown in Equation 7. In this case, the generated phase shift based precoding matrix may newly be reconstructed by selecting a number of specific columns corresponding to the current spatial multiplexing rate (reduced spatial multiplexing rate) from the generated phase shift based precoding matrix. In other words, a new precoding matrix applied to a corresponding system is not generated whenever the spatial multiplexing rate varies but the original phase shift based precoding matrix is used as it is, wherein a specific column of the corresponding precoding matrix is selected to reconstruct the precoding matrix.

For example, the precoding matrix of Equation 10 sets the spatial multiplexing rate of 2 in a multiple antenna system having two transmitting antennas. However, the spatial multiplexing rate may be lowered to 1 for some reason. In this case, a specific column of the matrix shown in Equation 10 may be selected to perform precoding. If the second column is selected, the phase shift based precoding matrix is equal to Equation 12 below, which becomes the same format as the cyclic delay diversity scheme of two transmitting antennas according to the related art.

$$P_{2\times 1}^k = \frac{1}{\sqrt{2}} \begin{pmatrix} e^{jk\theta_2} \\ 1 \end{pmatrix}$$ [Equation 12]

Although the example of the system having two transmitting antennas has been described, application of the present invention can be expanded to a system having four transmitting antennas. In other words, after the phase shift based precoding matrix is generated in the system having four transmitting antennas, a specific column may be selected depending on the variable spatial multiplexing rate to perform precoding. For example, FIG. 9 illustrates that the related art spatial multiplexing and cyclic delay diversity are applied to a multiple antenna system having four transmitting antennas and a spatial multiplexing rate of 2, and FIG. 10 illustrates that the phase shift based precoding matrix of Equation 10 is applied to the above multiple antenna system.

Figure 9:
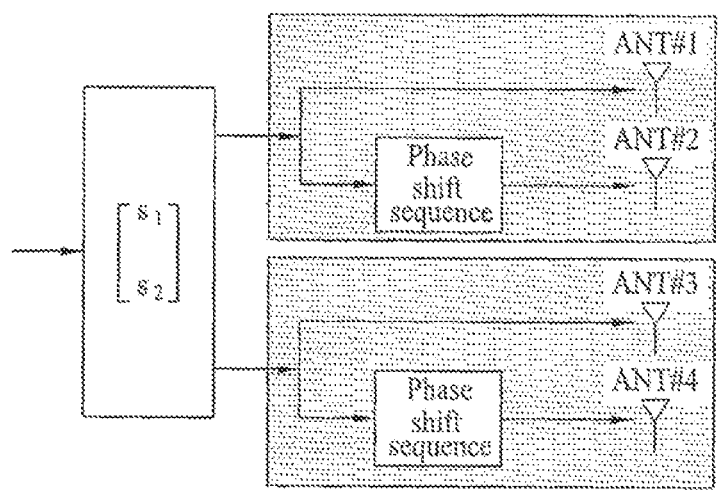
FIG. 9 illustrates a procedure of performing a related art phase shift diversity scheme in a system having four antennas and a spatial multiplexing rate of 2.

Referring to FIG. 9, a first sequence $S_1$ and a second sequence $S_2$ are transferred to a first antenna and a third antenna, and the first sequence $s_1 e^{j\theta_1}$ and the second sequence $s_2 e^{j\theta_1}$ which are phase-shifted at a predetermined level are transferred to a second antenna and a fourth antenna. Accordingly, it is noted that the spatial multiplexing rate becomes 2.

Figure 10:
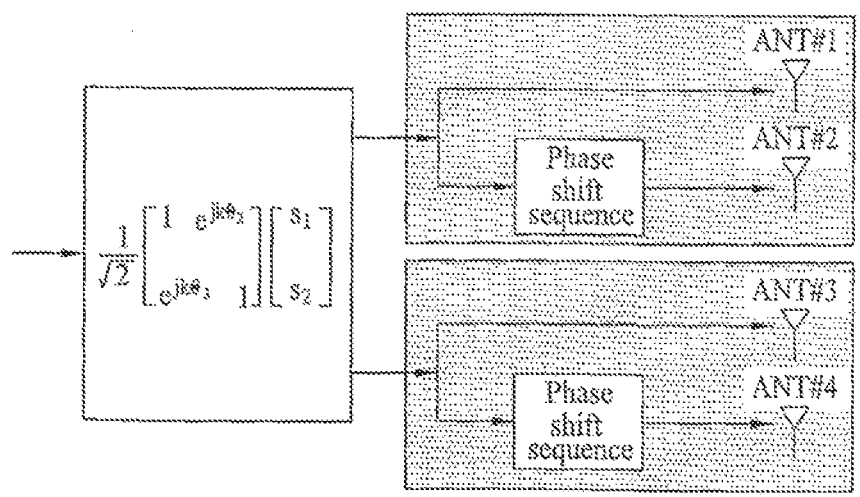
FIG. 10 illustrates a procedure of performing a phase shift based precoding scheme according to the present invention in the system of FIG. 9.

By contrast, referring to FIG. 10, $s_1 + s_2 e^{jk\theta_2}$ is transferred to the first antenna, $s_1 e^{jk\theta_3} + s_2$ to the second antenna, $s_1 e^{jk\theta_1} + s_2 e^{jk(\theta_1+\theta_2)}$ to the third antenna, and $s_1 e^{jk(\theta_1+\theta_3)} + s_2 e^{jk\theta_1}$ to the fourth antenna. Accordingly, since the system of FIG. 10 has an advantage of the cyclic delay diversity scheme along with an advantage of the precoding scheme as cyclic delay (or phase shift) is performed for four antennas by using a single precoding matrix.

The aforementioned phase shift based precoding matrix for each spatial multiplexing rate for the two-antenna system and the four-antenna system is expressed as follows.

TABLE 2

| Two-antenna system | | Four-antenna system | |
|---|---|---|---|
| Spatial multiplexing rate of 1 | Spatial multiplexing rate of 2 | Spatial multiplexing rate of 1 | Spatial multiplexing rate of 2 |
| $\frac{1}{\sqrt{2}}\begin{pmatrix} 1 \\ e^{j\theta_1^k} \end{pmatrix}$ | $\frac{1}{\sqrt{2}}\begin{pmatrix} 1 & -e^{-j\theta_1^k} \\ e^{j\theta_1^k} & 1 \end{pmatrix}$ | $\frac{1}{\sqrt{4}}\begin{pmatrix} 1 \\ e^{j\theta_1^k} \\ e^{j\theta_2^k} \\ e^{j\theta_3^k} \end{pmatrix}$ | $\frac{1}{\sqrt{4}}\begin{pmatrix} 1 & -e^{-j\theta_1^k} \\ e^{j\theta_1^k} & 1 \\ e^{j\theta_2^k} & -e^{-j\theta_3^k} \\ e^{j\theta_3^k} & e^{-j\theta_2^k} \end{pmatrix}$ |

Figure 11:
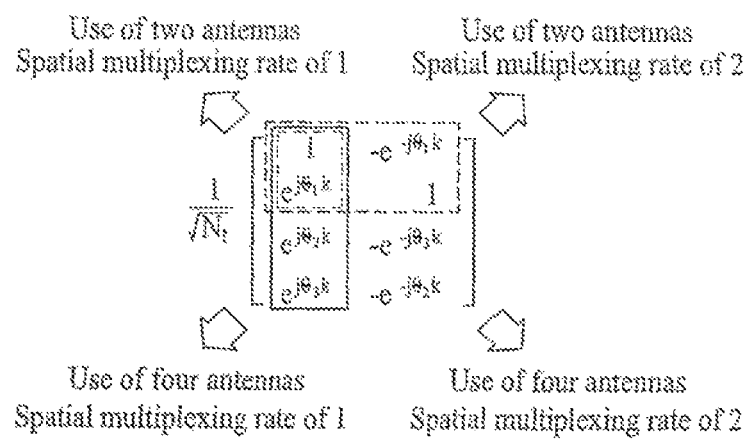
FIG. 11 is a precoding matrix used for a phase shift based precoding scheme according to the present invention in the system of FIG. 10.

In Table 2, $\theta_i$ (i=1, 2, 3) denotes a phase angle according to a cyclic delay value, and K is a sub-carrier index of OFDM. In Table 2, each of the four types of the precoding matrixes can be obtained by a specific part of a precoding matrix for the multiple antenna system having four transmitting antennas and a spatial multiplexing rate of 2 as shown in FIG. 11. Accordingly, since the codebook does not need each precoding matrix for the four types, memory capacity of the transmitter and the receiver can be saved. The aforementioned phase shift based precoding matrix can be expanded to a system having M number of antennas (M is a natural number greater than 2) and a spatial multiplexing rate of N (N is a natural number greater than 1) by the same principle.

Although the procedure of configuring the phase shift based precoding matrix having four transmitting antennas and the spatial multiplexing rate of 2 has been described as above, the phase shift based precoding may be generalized by Equation 13 below for a system having $N_t$ number of antennas ($N_t$ is a natural number greater than 2) and a spatial multiplexing rate of R (R is a natural number greater than 1). Hereinafter, the generalized phase shift based precoding will be referred to as generalized phase shift diversity (GPSD).

$$P_{N_t \times R}^k = \begin{pmatrix} e^{j\theta_1 k} & 0 & \cdots & 0 \\ 0 & e^{j\theta_2 k} & \cdots & 0 \\ \vdots & \vdots & \ddots & 0 \\ 0 & 0 & \cdots & e^{j\theta_{N_t} k} \end{pmatrix} U_{N_t \times R} \quad \text{[Equation 13]}$$

where, $P_{N_t}^k \times R$ denotes a GPSD matrix for the kth sub-carrier of a MIMO-OFDM signal having $N_t$ number of transmitting antennas and a spatial multiplexing rate of R, and $U_{N_t} \times R$ is a unitary matrix (second matrix) which satisfies $U_{N_t}^H \times R \times U_{N_t} R = II_{R \times R}$ and is used to allow a phase shift matrix (first matrix) to become a unitary matrix. In Equation 13, a phase angle $\theta_i(t)$, i=1, ..., $N_t$ can be obtained as follows in accordance with a delay value of $\tau_i(t)$, i=1, ..., $N_t$.

$$\theta_i = -2\pi/N_{\mathit{fft}} \cdot \tau_i \quad \text{[Equation 14]}$$

where, $N_{\mathit{fft}}$ denotes the number of sub-carriers of an OFDM signal.

An example of a generation equation of a GPSD matrix is as follows when the number of transmitting antennas is 2 and a 1-bit codebook is used.

$$P_{2\times 2}^k = \begin{pmatrix} \alpha & \beta \\ \beta & -\alpha \end{pmatrix}, \quad \alpha^2 + \beta^2 = 1 \quad \text{[Equation 15]}$$

multiplexing rate = 1   multiplexing rate = 2

In Equation 15, since a value $\beta$ is easily determined if a value $\alpha$ is determined, information of the value $\alpha$ is obtained in such a manner that two types of values $\alpha$ are determined and their information is fed back by a codebook index. For example, the value $\alpha$ is previously determined between the transmitter and the receiver that $\alpha$ is equal to 0.2 if a feedback index is 0 while $\alpha$ is equal to 0.8 if a feedback index is 1.

A predetermined precoding matrix for obtaining SNR gain can be used as an example of the second matrix. When Walsh code is used as the precoding matrix, a generation equation of the phase shift based precoding matrix P is as follow.

$$P_{4\times 4}^k = \frac{1}{\sqrt{4}} \begin{pmatrix} e^{j\theta_1 k} & 0 & 0 & 0 \\ 0 & e^{j\theta_2 k} & 0 & 0 \\ 0 & 0 & e^{j\theta_3 k} & 0 \\ 0 & 0 & 0 & e^{j\theta_4 k} \end{pmatrix} \begin{pmatrix} 1 & 1 & 1 & 1 \\ 1 & -1 & 1 & -1 \\ 1 & 1 & -1 & -1 \\ 1 & -1 & -1 & 1 \end{pmatrix} \quad \text{[Equation 16]}$$

Equation 16 is based on a system having four transmitting antennas and a spatial multiplexing rate of 4. In this case, the second matrix is properly reconstructed to select a specific transmitting antenna or tune the spatial multiplexing rate.

Equation 17 shows that the second matrix is reconstructed to select two antennas in a system having four transmitting antennas.

$$P_{4\times 4}^k = \frac{1}{\sqrt{4}} \begin{pmatrix} e^{j\theta_1 k} & 0 & 0 & 0 \\ 0 & e^{j\theta_2 k} & 0 & 0 \\ 0 & 0 & e^{j\theta_3 k} & 0 \\ 0 & 0 & 0 & e^{j\theta_4 k} \end{pmatrix} \begin{pmatrix} 0 & 0 & 1 & 1 \\ 0 & 0 & 1 & -1 \\ 1 & 1 & 0 & 0 \\ 1 & -1 & 0 & 0 \end{pmatrix} \quad \text{[Equation 17]}$$

Also, Table 3 shows a method for reconstructing the second matrix suitable for a spatial multiplexing rate when the spatial multiplexing rate varies depending on time or channel status.

$$P_{4\times 4}^k = \frac{1}{\sqrt{4}} \begin{pmatrix} e^{j\theta_1 k} & 0 & 0 & 0 \\ 0 & e^{j\theta_2 k} & 0 & 0 \\ 0 & 0 & e^{j\theta_3 k} & 0 \\ 0 & 0 & 0 & e^{j\theta_4 k} \end{pmatrix}$$ [Equation 18]

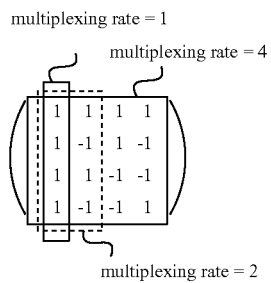

Although Equation 18 shows that first column, first and second columns, and first to fourth columns of the second matrix are selected depending on the multiplexing rate, any one of first, second, third and fourth columns may be selected if the multiplexing rate is 1 while any two of the first, second, third and fourth columns may be selected if the multiplexing rate is 2.

Meanwhile, the second matrix may be provided in the transmitter and the receiver in the codebook form. In this case, index information of the codebook is fed back from the receiver to the transmitter, and the transmitter selects a unitary matrix (latter half matrix) of the corresponding index from its codebook and then constructs a phase shift based precoding matrix by using Equation 13 above.

Furthermore, the second matrix may be changed periodically so that carriers transmitted to one time slot have different precoding matrixes for each frequency band.

Meanwhile, a cyclic delay value for the phase shift based precoding could be a value previously determined in the transmitter and the receiver or a value transmitted from the receiver to the transmitter through feedback. Also, although the spatial multiplexing rate R may be a value previously determined in the transmitter and the receiver, the receiver may calculate the spatial multiplexing rate by checking the channel status and feed back the calculated value to the transmitter. Alternatively, the transmitter may calculate and change the spatial multiplexing rate by using channel information fed back from the receiver.

The expanded type of the aforementioned phase shift based precoding can be expressed as follows.

$$P_{N_t \times R}^k = \begin{pmatrix} e^{j\theta_1 k} & 0 & L & 0 \\ 0 & e^{j\theta_2 k} & L & 0 \\ M & M & O & 0 \\ 0 & 0 & 0 & e^{j\theta_{N_t} k} \end{pmatrix}$$ [Equation 19]
$\underbrace{\phantom{xxxxxxxxxxxxxxxxx}}_{D_1}$ -continued
$$(W_{N_t \times R}) \begin{pmatrix} e^{j\theta'_1 k} & 0 & L & 0 \\ 0 & e^{j\theta'_2 k} & L & 0 \\ M & M & O & 0 \\ 0 & 0 & 0 & e^{j\theta'_R k} \end{pmatrix} (U_{R \times R})$$
$\underbrace{\phantom{xxxxxxxxxxxxxxxxx}}_{D_2}$ In Equation 19 above, $D_1$ is used to change a channel, and $D_2$ is used to equalize a channel between respective streams. Also, $W_{N_t \times R}$ and $U_{R \times R}$ denote unitary matrixes.

Now, a procedure of performing ARQ for error correction using the aforementioned phase shift based precoding will be described. It is assumed that initial transmission is performed using a precoding matrix having two transmitting antennas and a spatial multiplexing rate of 2 in a multiple codeword (MCW) structure. However, as described above, a precoding matrix for a system having M number of antennas (M is a natural number greater than 2) and a spatial multiplexing rate of N (N is a natural number greater than 1) may be used, and a single codeword (SCW) structure may be used.

In the multiple codeword structure, a plurality of packets may be transmitted simultaneously through spatial multiplexing. Packet transmission can be performed by two types of cases. That is, the former case corresponds to the case where errors occur in all packets even though i number of packets (i is a natural number greater than 2) have been transmitted, and the latter case corresponds to the case where errors occur in j number of packets (j is a natural number smaller than i) even though i number of packets have been transmitted. First of all, the former case will be described.

Figure 12:
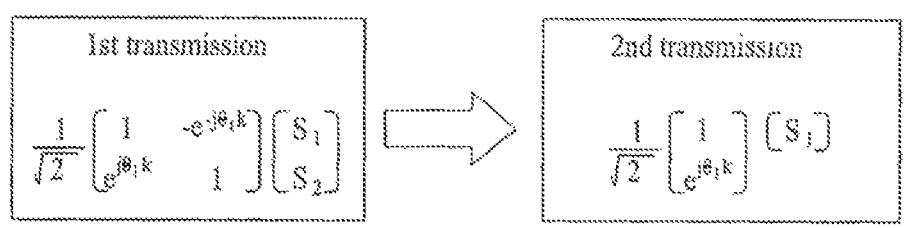
FIG. 12 illustrates precoding matrixes for initial transmission and retransmission used if errors occur in all of a plurality of packets which are simultaneously transmitted in a multiple codeword (MCW) structure.

As shown in FIG. 12, a precoding matrix having a spatial multiplexing rate of 2 is used during initial transmission, and if NACK signal is arrived from the receiver due to transmission packet errors, the precoding matrix is reconstructed such that the first column or the second column is selected from the precoding matrix during initial transmission to obtain the spatial multiplexing rate of 1. Then, ARQ is performed. If the spatial multiplexing rate is lowered, the transmission power can be increased, whereby transmission reliability can be improved. At this time, transmitting antennas used for retransmission can be selected as those having excellent channel status referring to channel quality information transmitted from the receiver.

Next, if errors occur in some of the transmitted packets like the latter case, two types of ARQ schemes can be considered. In case of the first type, only packets in which errors occur are retransmitted, and a spatial resource for normal packets is not used for retransmission. This type is called a blanking method. According to the blanking method, a new packet is not transmitted until j number of packets in which errors occur are restored by ARQ. In case of the second type, j number of packets are retransmitted and at the same time a new packet is transmitted through a spatial resource for the other packets. This type is called a non-blanking method.

Multiple Antenna Based ARQ Scheme in Blanking Method

1. Antenna Hopping ARQ Scheme

Antennas other than transmitting antennas used for initial transmission are selected for retransmission.

2. Antenna Selection ARQ Scheme

Transmitting antennas for retransmission are selected through transmitting antenna related information fed back from the receiver. Alternatively, transmitting antennas are randomly selected through direct channel estimation at the transmitter to perform retransmission.

3. Phase Shift Diversity ARQ Scheme

The spatial multiplexing scheme or the phase shift diversity scheme is used during initial transmission, and a phase shift based precoding method having a spatial multiplexing rate corresponding to the number of packets in which errors occur is used during retransmission.

Figure 13:
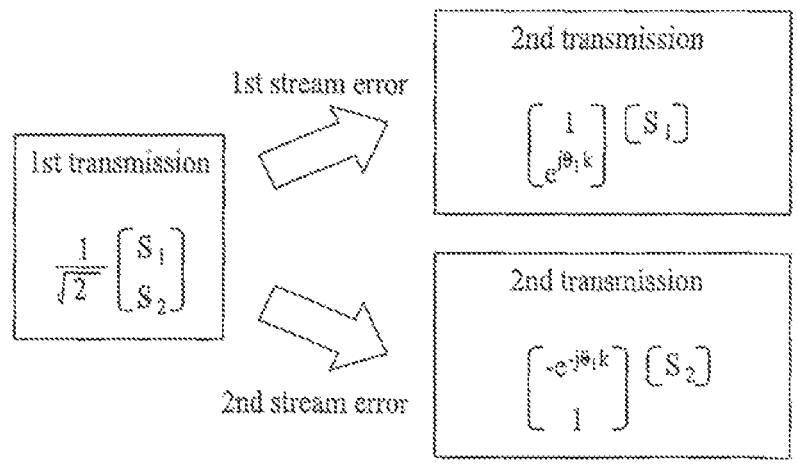
FIG. 13 illustrates precoding matrixes used in one embodiment of a phase shift diversity ARQ scheme for the case where errors occur in some of a plurality of packets which are simultaneously transmitted in an MCW structure.
Figure 14:
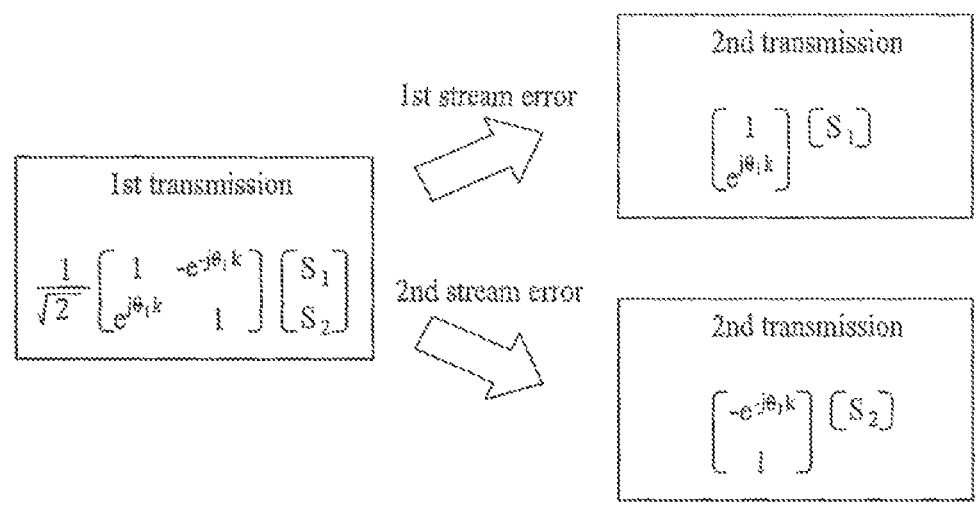
FIG. 14 illustrates precoding matrixes used in another embodiment of a phase shift diversity ARQ scheme for the case where errors occur in some of a plurality of packets which are simultaneously transmitted in an MCW structure.

In other words, as shown in FIG. 13, the spatial multiplexing scheme having a spatial multiplexing rate of 2 is used during initial transmission. If errors occur in the transmission packets, retransmission is performed in such a manner that the first column or the second column is selected from the phase shift based precoding matrix of the two-transmitting antenna system to reconstruct the precoding matrix having a spatial multiplexing rate of 1. Also, as shown in FIG. 14, the phase shift diversity scheme having a spatial multiplexing rate of 2 is used during initial transmission. If errors occur in the transmission packets, retransmission is performed in such a manner that the first column or the second column is selected from the phase shift based precoding matrix of the two-transmitting antenna system to reconstruct the precoding matrix having a spatial multiplexing rate of 1. Alternatively, retransmission is performed by changing transmitting antennas even though the phase shift based precoding matrix is used.

4. Hybrid ARQ Scheme

Figure 8:
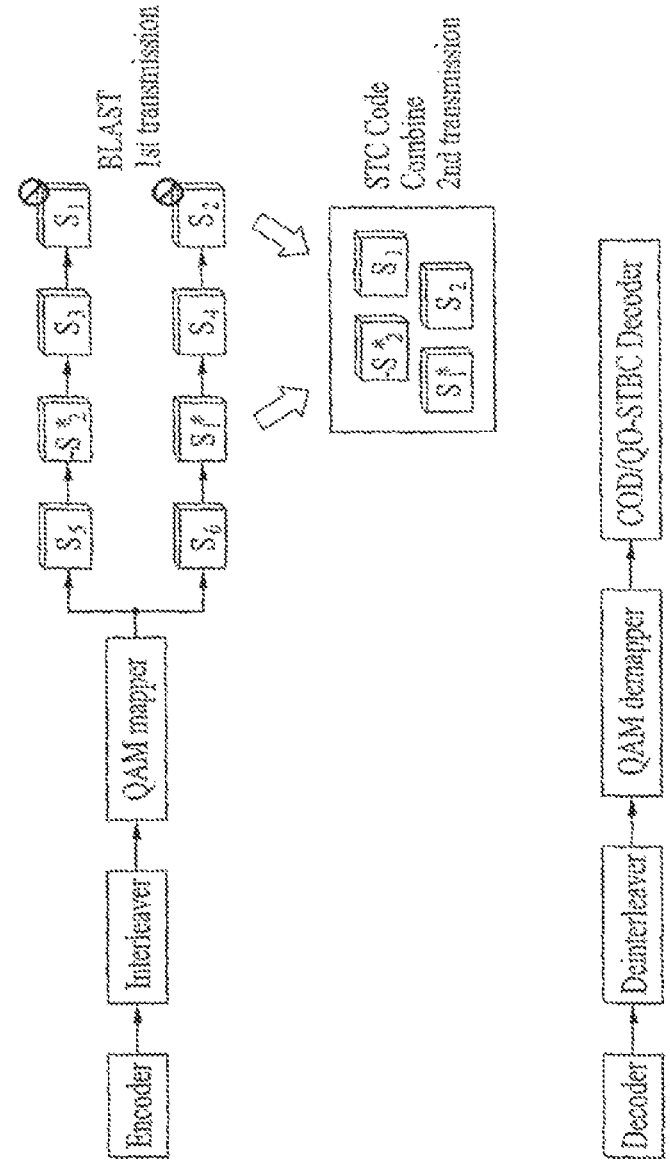
FIG. 8 illustrates a concept of a time-space symbol based HARQ scheme.
Figure 15:
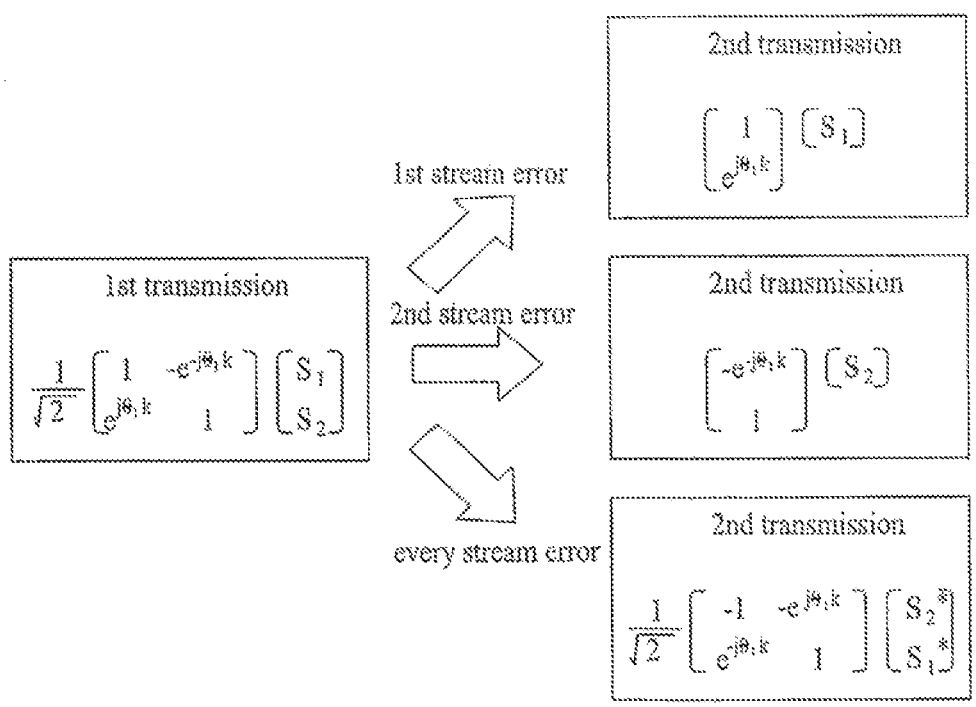
FIG. 15 illustrates precoding matrixes used in one embodiment of a hybrid ARQ scheme for the case where errors occur in some of a plurality of packets which are simultaneously transmitted in an MCW structure.

If errors occur in j number of packets, the antenna hopping ARQ scheme or the phase shift diversity ARQ scheme is used. If errors occur in all packets, the time-space symbol based HARQ of FIG. 8 is used. FIG. 15 illustrates the procedure of performing the phase shift diversity ARQ scheme when errors occur in some packets and performing the time-space symbol based HARQ when errors occur in all packets.

Multiple Antenna Based ARQ Scheme in Non-Blanking Method

1. Antenna Hopping ARQ Scheme

Figure 16:
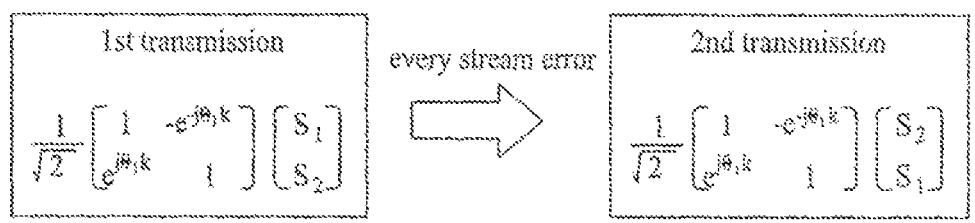
FIG. 16 illustrates precoding matrixes used in one embodiment of an antenna hopping ARQ scheme for the case where errors occur in some of a plurality of packets which are simultaneously transmitted in an MCW structure.

Antennas other than transmitting antennas used for initial transmission are selected to perform retransmission. FIG. 16 illustrates the procedure of hopping antennas for retransmission when packets are transmitted through the phase shift diversity scheme.

2. Phase Shift Diversity ARQ Scheme

Figure 17:
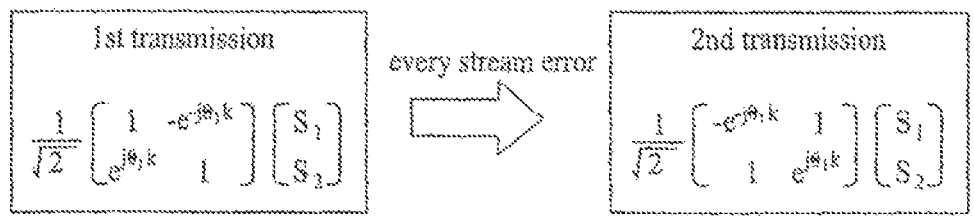
FIG. 17 illustrates precoding matrixes used in another embodiment of a phase shift diversity ARQ scheme for the case where errors occur in some of a plurality of packets which are simultaneously transmitted in an MCW structure.

The spatial multiplexing scheme or the phase shift diversity scheme is used for initial transmission. The phase shift based precoding method is used for retransmission, wherein the position of each column in the precoding matrix is varied. FIG. 17 illustrates the procedure of exchanging respective columns of the phase shift based precoding matrix during retransmission when packets are transmitted through the phase shift diversity scheme.

3. Hybrid ARQ Scheme

If errors occur in j number of packets, the antenna hopping ARQ scheme or the phase shift diversity ARQ scheme in the non-blanking method is used. If errors occur in all packets, the time-space symbol based HARQ of FIG. 8 is used.

At least any one of channel-adaptive HARQ/channel-non-adaptive HARQ, chase combining scheme/incremental redundancy scheme, and synchronous HARQ/asynchronous HARQ may be used as the aforementioned ARQ scheme.

Transmitting and Receiving Apparatus Which Supports First Method

Figure 18:
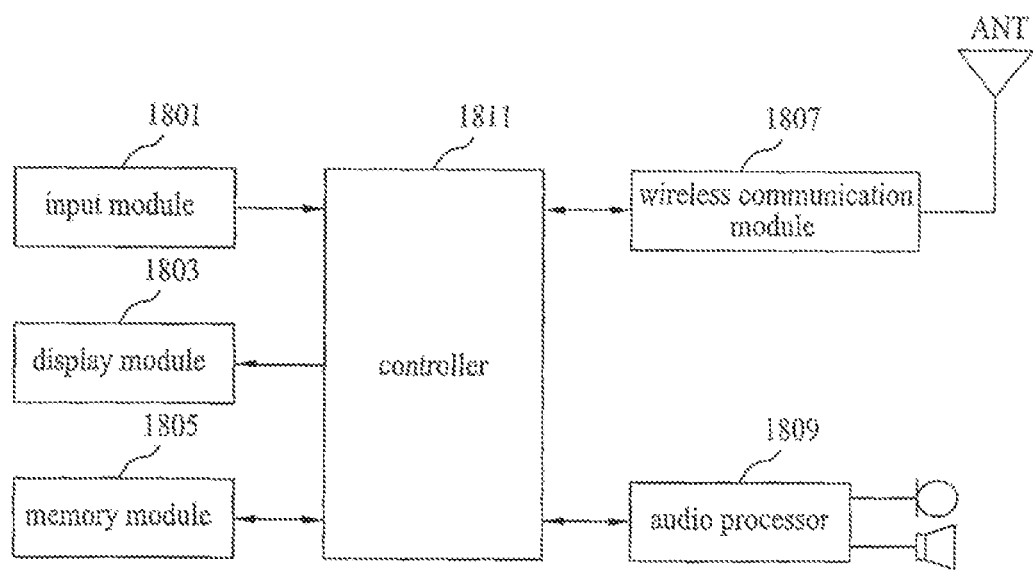
FIG. 18 is a block diagram illustrating a transmitting/receiving apparatus which supports a hybrid ARQ scheme based on a multiple antenna system according to the present invention.

FIG. 18 is a block diagram illustrating internal configuration of a transmitting and receiving apparatus which supports the first method. The transmitting and receiving apparatus includes an input module 1801 selecting a desired function or inputting information, a display module 1803 displaying various kinds of information for operating the transmitting and receiving apparatus, a memory module 1805 storing various programs required for the operation of the transmitting and receiving apparatus and data to be transmitted to the receiver, a wireless communication module 1807 receiving an external signal and transmitting data to the receiver, an audio processor 1809 converting a digital audio signal into an analog audio signal, amplifying the signal and outputting the amplified signal through a speaker SP or amplifying the audio signal from a mike MIC and converting the signal into a digital signal, and a controller 1811 controlling entire driving of the transmitting and receiving apparatus.

Figure 19:
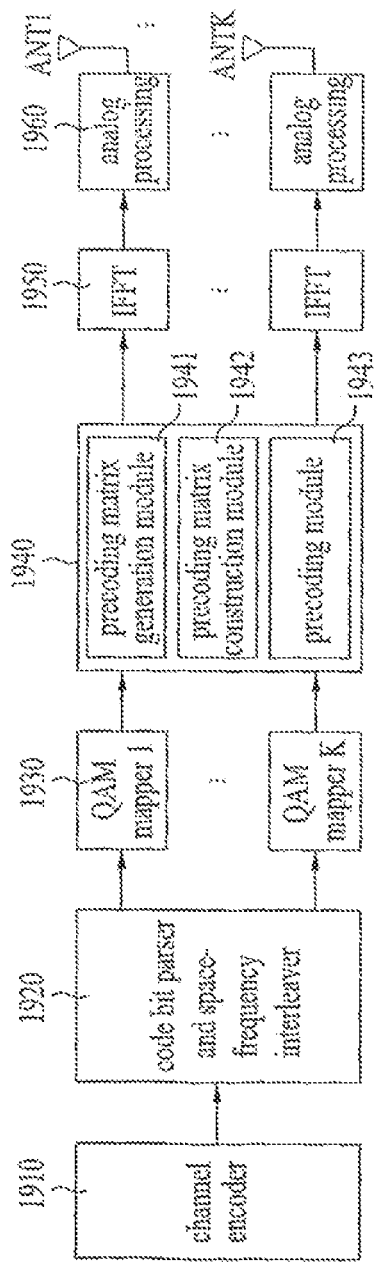
FIG. 19 is a block diagram illustrating an SCW OFDM transmitter constituting a wireless communication module of FIG. 18.
Figure 20:
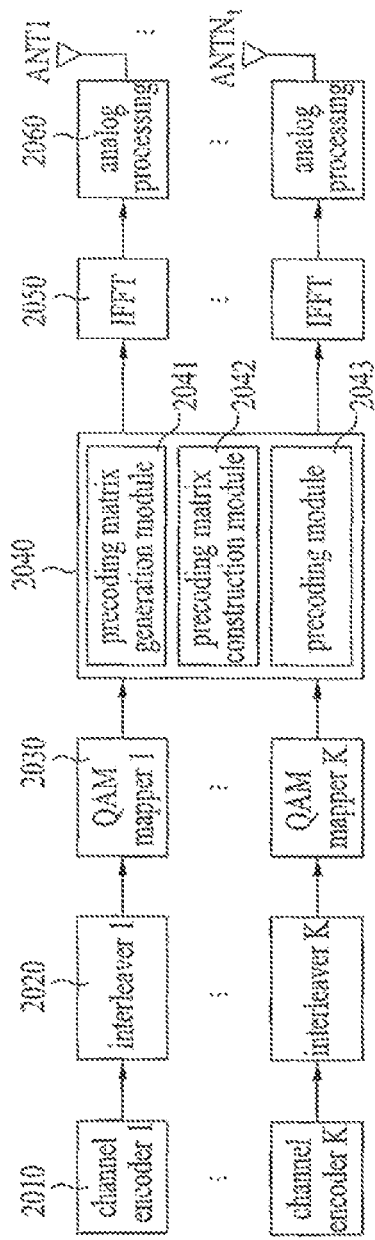
FIG. 20 is a block diagram illustrating an MCW OFDM transmitter constituting a wireless communication module of FIG. 18.

The configuration of the wireless communication module 1807 will be described in more detail. FIG. 19 illustrates the configuration of a single codeword (SCW) OFDM transmitter included in the wireless communication module 1807, and FIG. 20 illustrates the configuration of an MCW OFDM transmitter included in the wireless communication module 1807. Also, since the receiver corresponding to the transmitter includes modules having inverse functions of the respective modules of the transmitter, its detailed description will be omitted.

In the SCW OFDM transmitter, a channel encoder 1910 adds redundant bits to transmission data bits to prevent the transmission bits from being distorted in a channel, and performs channel encoding by using an encoding code such as LDPC code. An interleaver 1920 performs interleaving through code bit parsing to minimize loss due to instantaneous noise in data transmission, and a mapper 1930 converts the interleaved data bits into OFDM symbols. This symbol mapping can be performed through phase modulation such as QPSK or amplitude modulation such as 16QAM, 8QAM and 4QAM. Afterwards, the OFDM symbols are carried in carriers of a time domain through a precoder 1940, a subchannel modulator (not shown), and an IFFT 1950, sequentially, and then transmitted to a radio channel through a filter (not shown) and an analog converter 1960. Meanwhile, the MCW OFDM transmitter has the same configuration as that of the SCW OFDM transmitter excluding that OFDM symbols are arranged in parallel for each channel and then transmitted to a channel encoder 2010 and an interleaver 2020.

Precoding matrix determination modules 1941 and 2041 determine the first precoding matrix for sub-carriers of the first index, and phase shifts the first precoding matrix to determine precoding matrixes for the other sub-carriers. In the present invention, precoding is performed using a unitary matrix of (the number of transmitting antennas)×(spatial multiplexing rate) size, wherein the unitary matrix is provided for each index of sub-carriers. The unitary matrix for the first index is phase shifted to obtain unitary matrixes of the other indexes. This will be described in more detail.

In other words, the precoding matrix determination modules 1941 and 2041 select a random precoding matrix in a codebook previously stored in a memory (not shown) and determines the selected precoding matrix as a precoding matrix (first precoding matrix) for sub-carrier of the first index. In this case, the first precoding matrix may also be selected depending on predetermined policies, channel status, etc.

Subsequently, the first precoding matrix is phase shifted at a predetermined size to generate a second precoding matrix for sub-carrier of the second index. At this time, the size of the shifted phase may be set depending on the current channel status and/or the presence of feedback information from the receiver. The second precoding matrix is phase shifted at a predetermined size to generate a third precoding matrix for sub-carrier of the third index. In other words, the procedure of generating the second precoding matrix is repeated in the procedure of generating the third precoding matrix to the last precoding matrix.

Precoding matrix reconstruction modules 1942 and 2042 are previously set in the memory from each precoding matrix generated in the precoding matrix generation modules 1941 and 2041 or reconstruct the precoding matrixes depending on information reported from a controller 1811. In this case, reconstruction of the precoding matrixes may vary depending on types of ARQ schemes supported by the transmitting and receiving apparatus. In other words, reconstruction of the precoding matrixes may be performed in such a manner that a specific column of the precoding matrix is selected to lower the spatial multiplexing rate or the position of each row or column of the precoding matrix is exchanged.

Precoding modules 1943 and 2043 perform precoding by substituting OFDM sequence of the corresponding sub-carrier for the reconstructed precoding matrix.

In addition, if the transmitting and receiving apparatus supports any one of the antenna hopping ARQ scheme, the antenna selection ARQ scheme, the phase shift diversity ARQ scheme, and the hybrid ARQ scheme in the blanking method or any one of the antenna hopping ARQ scheme, the phase shift diversity ARQ scheme, and the hybrid ARQ scheme in the non-blanking method, the transmitting and receiving apparatus may further include any one or more of a spatial multiplexing module (not shown), a phase shift diversity module (not shown), and a time-space symbol module (not shown).

The controller 1811 reports various kinds of information for changing or reconstructing the precoding matrix depending on the ARQ scheme supported by the transmitting and receiving apparatus to the precoding matrix reconstruction modules 1942 and 2042 or updates spatial multiplexing rate information stored in the memory so that the precoding matrix reconstruction modules 1942 and 2042 are operated referring to the updated information.

Second Embodiment

In the aforementioned first method, a corresponding precoding matrix is changed such that phase value offset and/or sub-carrier index offset information, which is fed back from the receiver or randomly set in the transmitter, is applied to the phase shift based precoding matrix before reconstruction to lower the spatial multiplexing rate, whereby a precoding matrix optimized for retransmission can be obtained. Hereinafter, the procedure of changing the precoding matrix by allowing the system having four antennas and a spatial multiplexing rate of 2 to apply phase value offset and/or sub-carrier index offset to the phase shift based precoding matrix in Table 2 will be described in accordance with embodiments. In this case, it will be apparent to those with ordinary skill in the art to which the present invention pertains that the improved phase shift based precoding method of the present invention is not limited to the following embodiments and is applicable to a system having M number of antennas (M is a natural number greater than 2) and a spatial multiplexing rate of N (N is a natural number greater than 1).

First Feedback Embodiment

Figure 21A:
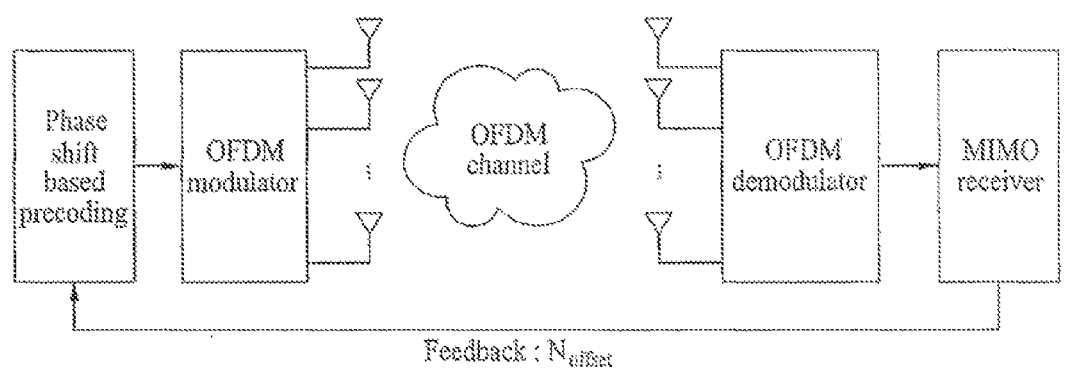
FIG. 21A and FIG. 21B illustrate a concept of a phase shift based precoding scheme in which a sub-carrier index offset is fed back in accordance with the present invention.

In this embodiment, as shown in FIG. 21A, sub-carrier index offset $N_{offset}$ is fed back from the receiver and then applied to the phase shift based precoding matrix.

Figure 21B:
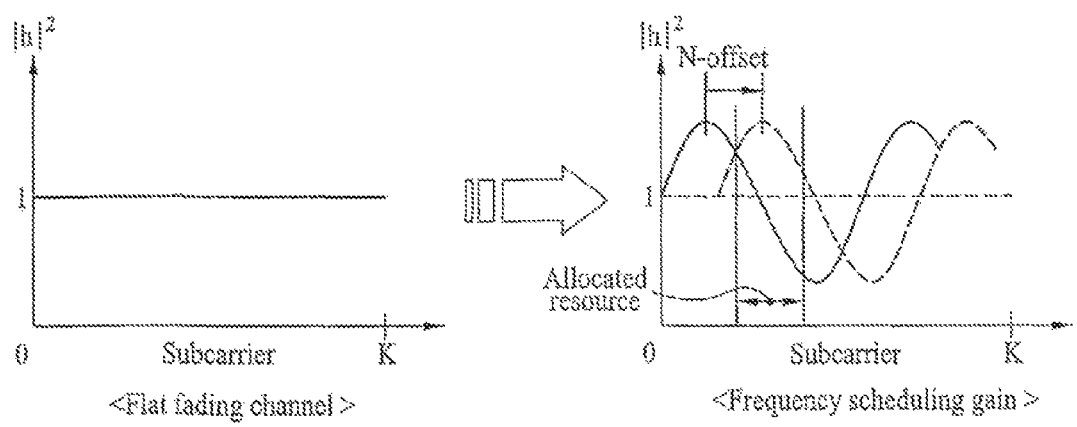

As shown in FIG. 21B, it is noted that a channel area (area allocated for a solid line sine wave) initially allocated to sub-carrier of index k is relatively poorer than the other areas. Accordingly, the receiver checks the channel status of the resource allocated to the corresponding sub-carrier, sets a proper offset $N_{offset}$, and feeds back the set offset $N_{offset}$ to the transmitter. The transmitter applies the fed-back offset $N_{offset}$ to the existing phase shift based precoding matrix so that the corresponding sub-carrier moves to the optimized channel area (area allocated for a dotted line sine wave). An equation of the phase shift based precoding matrix to which the feedback index offset $N_{offset}$ has been applied can be expressed as follows.

$$\frac{1}{\sqrt{4}} \begin{pmatrix} 1 & -e^{-j\theta_1(k+N_{offset})} \\ e^{j\theta_1(k+N_{offset})} & 1 \\ e^{j\theta_2(k+N_{offset})} & -e^{-j\theta_3(k+N_{offset})} \\ e^{j\theta_3(k+N_{offset})} & e^{-j\theta_2(k+N_{offset})} \end{pmatrix} \quad \text{[Equation 20]}$$

When Equation 19 is applied to the generalized phase shift diversity scheme, the following Equation 21 can be obtained.

$$P^k_{N_t \times R} = \quad \text{[Equation 21]}$$

$$\begin{pmatrix} e^{j\theta_1(k+N_{offset})} & 0 & L & 0 \\ 0 & e^{j\theta_2(k+N_{offset})} & L & 0 \\ M & M & O & 0 \\ 0 & 0 & L & e^{j\theta_{N_t}(k+N_{offset})} \end{pmatrix} U_{N_t \times R}$$

Also, when Equation 19 is applied to the expanded phase shift diversity scheme, the following Equation 22 can be obtained.

$$P^k_{N_t \times R} = \begin{pmatrix} e^{j\theta_1(k+N_{offset})} & 0 & L & 0 \\ 0 & e^{j\theta_2(k+N_{offset})} & L & 0 \\ M & M & O & 0 \\ 0 & 0 & 0 & e^{j\theta_{N_t}(k+N_{offset})} \end{pmatrix} \quad \text{[Equation 22]}$$

$$\underbrace{\phantom{aaaaaaaaaaaaaaaaaaaaaaaa}}_{D_1}$$

$$W_{N_t \times R} \begin{pmatrix} e^{j'_1 k} & 0 & L & 0 \\ 0 & e^{j\theta'_2 k} & L & 0 \\ M & M & O & 0 \\ 0 & 0 & 0 & e^{j\theta'_R k} \end{pmatrix} U_{R \times R}$$

$$\underbrace{\phantom{aaaaaaaaaaaaaaaa}}_{D_2}$$

Second Feedback Embodiment

Figure 22A:
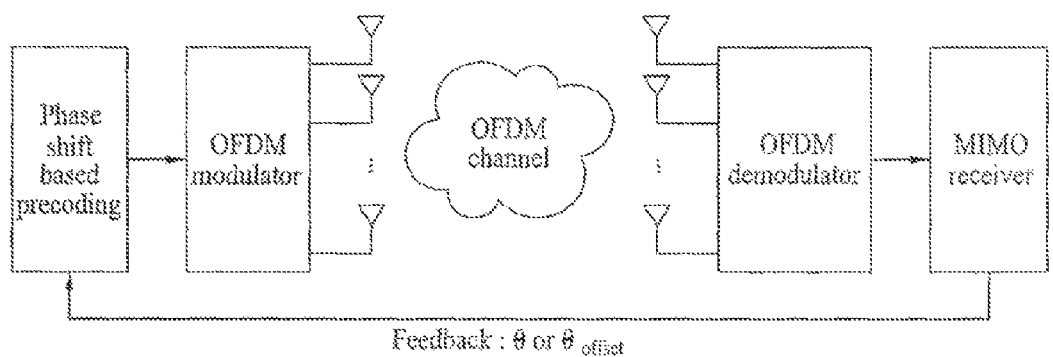
FIG. 22A and FIG. 22B illustrate a concept of a phase shift based precoding scheme in which a phase value offset is fed back in accordance with the present invention.

In this embodiment, as shown in FIG. 22A, either a proper phase value $\theta$ or a phase value offset $\theta_{offset}$ which is the difference between a previous feedback phase value and the optimized phase value is fed back from the receiver and then applied to the phase shift based precoding matrix. Also, a value previously determined depending on the number of retransmission times may be used as the phase value offset $\theta_{offset}$.

Figure 22B:
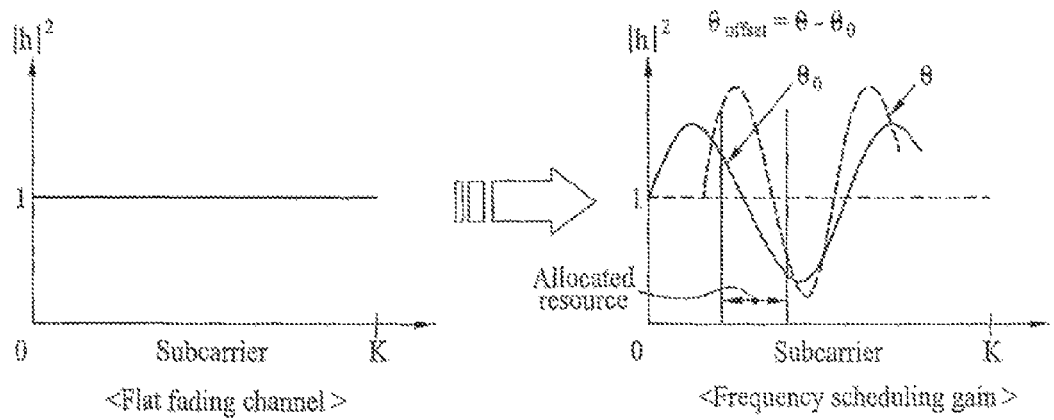

As shown in FIG. 22B, it is noted that a channel area (area allocated for a solid line sine wave) initially allocated to sub-carrier of index k having a phase of $\theta_0$ is relatively poorer than the other areas. Accordingly, the receiver checks the channel status of the resource allocated to the corresponding sub-carrier, sets a proper offset $\theta$, compares the set offset $\theta$ with the fed-back phase value $\theta_0$, and feeds back the result offset $\theta_{offset}$ which is the difference value to the transmitter. The transmitter applies the fed-back offset $\theta_{offset}$ to the existing phase shift based precoding matrix so that the corresponding sub-carrier moves to a channel area (area allocated for a dotted line sine wave) which is relatively more excellent than before. An equation of the phase shift based precoding matrix to which the fed-back offset $\theta_{offset}$ has been applied can be expressed as follows.

$$\frac{1}{\sqrt{4}} \begin{pmatrix} 1 & -e^{-j(\theta_1+\theta_{1,offset})k} \\ e^{j(\theta_1+\theta_{1,offset})k} & 1 \\ e^{j(\theta_2+\theta_{2,offset})k} & -e^{-j(\theta_3+\theta_{3,offset})k} \\ e^{j(\theta_3+\theta_{3,offset})k} & -e^{-j(\theta_2+\theta_{2,offset})k} \end{pmatrix} \quad \text{[Equation 23]}$$

Meanwhile, if the receiver checks the status of the channel allocated to the corresponding sub-carrier, sets an optimized phase value $\theta$, and directly feeds back the set value to the transmitter, the transmitter may newly generate the phase shift based precoding matrix based on the fed-back phase value.

When Equation 23 is applied to the generalized phase shift diversity scheme, the following Equation 24 can be obtained.

$$P_{N_t \times R}^k = \quad \text{[Equation 24]}$$

$$\begin{pmatrix} e^{j(\theta_1+\theta_{1,offset})k} & 0 & L & 0 \\ 0 & e^{j(\theta_2+\theta_{2,offset})k} & L & 0 \\ M & M & O & 0 \\ 0 & 0 & L & e^{j(\theta_{N_t}+\theta_{N_t,offset})k} \end{pmatrix} U_{N_t \times R}$$

Also, when Equation 23 is applied to the expanded phase shift diversity scheme, the following Equation 25 can be obtained.

$$P_{N_t \times R}^k = \quad \text{[Equation 25]}$$

$$\underbrace{\begin{pmatrix} e^{j(\theta_1+\theta_{1,offset})k} & 0 & L & 0 \\ 0 & e^{j(\theta_2+\theta_{2,offset})k} & L & 0 \\ M & M & O & 0 \\ 0 & 0 & L & e^{j(\theta_{N_t}+\theta_{N_t,offset})k} \end{pmatrix}}_{D_1}$$

$$W_{N_t \times R} \underbrace{\begin{pmatrix} e^{j\theta'_1 k} & 0 & L & 0 \\ 0 & e^{j\theta'_2 k} & L & 0 \\ M & M & O & 0 \\ 0 & 0 & 0 & e^{j\theta'_R k} \end{pmatrix}}_{D_2} U_{R \times R}$$

The offset $\theta_{offset}$ Equations 24 and 25 may be fed back from the receiver. Alternatively, a previously determined value may be used as the offset $\theta_{offset}$ depending on the number of retransmission times.

Third Feedback Embodiment

Figure 23A:
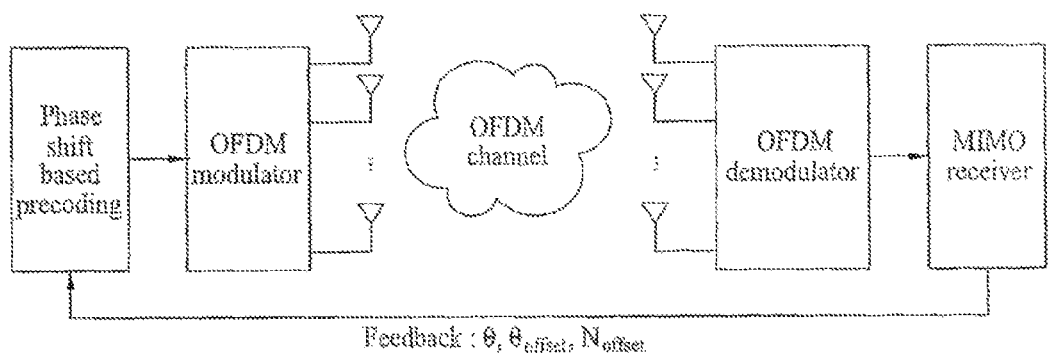
FIG. 23A and FIG. 23B illustrate a concept of a phase shift based precoding scheme in which a sub-carrier index offset and a phase value offset are fed back in accordance with the present invention.

In this embodiment, as shown in FIG. 23A, a proper phase value $\theta$ and a sub-carrier index offset are fed back from the receiver. Alternatively, a phase value offset $\theta_{offset}$ which is the difference between the previous feedback phase value and the optimized phase value and a subcarier index offset $N_{offset}$ are fed back from the receiver. Thus, the resultant values are applied to the phase shift based precoding matrix.

Figure 23B:
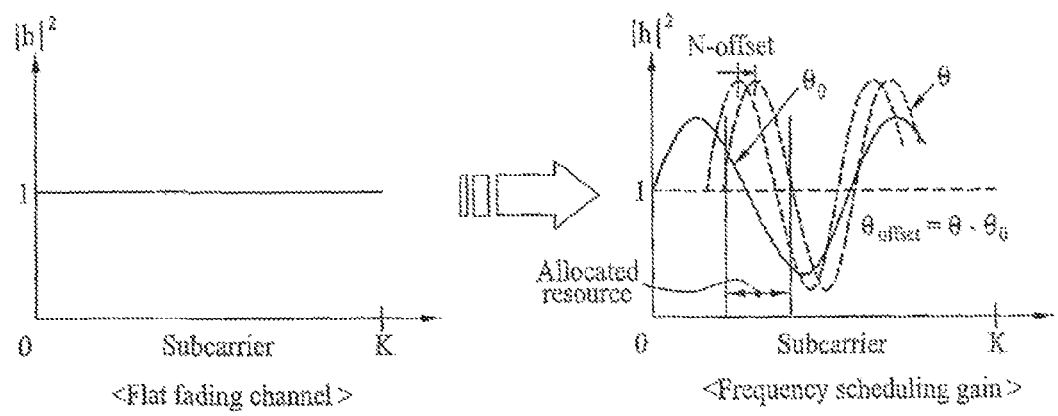

As shown in FIG. 23B, it is noted that a channel area (area allocated for a solid line sine wave) initially allocated to sub-carrier of index k having a phase of $\theta_0$ is relatively poorer than the other areas. Accordingly, the receiver checks the channel status of the resource allocated to the corresponding sub-carrier, sets a phase value $\theta$ for an optimized status and a sub-carrier index offset $N_{offset}$, feeds back an offset value $\theta_{offset}$ which is the difference between the phase value $\theta$ and the previous feedback phase value $\theta_0$ and the sub-carrier index offset $N_{offset}$ to the transmitter. Then, the transmitter adds the fed-back offset values $\theta_{offset}$ and $N_{offset}$ to the existing phase shift based precoding matrix so that the corresponding sub-carrier moves to the optimized channel area (area allocated for a dotted line sine wave). An equation of the phase shift based precoding matrix to which the fed-back offset values $\theta_{offset}$ and $N_{offset}$ have been applied can be expressed as follows.

$$\frac{1}{\sqrt{4}} \begin{pmatrix} 1 & -e^{-j(\theta_1+\theta_{1,offset})k} \\ e^{j(\theta_1+\theta_{1,offset})k} & 1 \\ e^{j(\theta_2+\theta_{2,offset})k} & -e^{-j(\theta_3+\theta_{3,offset})k} \\ e^{j(\theta_3+\theta_{3,offset})k} & -e^{-j(\theta_2+\theta_{2,offset})k} \end{pmatrix} \quad \text{[Equation 26]}$$

When Equation 26 is applied to the generalized phase shift diversity scheme, the following Equation 27 can be obtained.

$$P_{N_t \times R}^k = \begin{pmatrix} e^{j(\theta_1+\theta_{1,offset})(k+N_{offset})} & 0 & L & 0 \\ 0 & e^{j(\theta_2+\theta_{2,offset})(k+N_{offset})} & L & 0 \\ M & M & O & 0 \\ 0 & 0 & L & e^{j(\theta_{N_t}+\theta_{N_t,offset})(k+N_{offset})} \end{pmatrix} U_{N_t \times R} \quad \text{[Equation 27]}$$

Also, when Equation 28 is applied to the expanded phase shift diversity scheme, the following Equation 28 can be obtained.

$$P^k_{N_t \times R} = \underbrace{\begin{pmatrix} e^{j(\theta_1+\theta_{1,offset})(k+N_{offset})} & 0 & L & 0 \\ 0 & e^{j(\theta_2+\theta_{2,offset})(k+N_{offset})} & L & 0 \\ M & M & O & 0 \\ 0 & 0 & L & e^{j(\theta_{N_t}+\theta_{N_t,offset})(k+N_{offset})} \end{pmatrix}}_{D_1} \quad [\text{Equation 28}]$$

$$W_{N_t \times R} \underbrace{\begin{pmatrix} e^{j\theta'_1 k} & 0 & L & 0 \\ 0 & e^{j\theta'_2 k} & L & 0 \\ M & M & O & 0 \\ 0 & 0 & 0 & e^{j\theta'_R k} \end{pmatrix}}_{D_2} U_{R \times R}$$

Fourth Feedback Embodiment

In this embodiment, a sub-carrier index of the phase shift based precoding matrix is used as a sub-carrier index offset $N_{offset}$ fed back from the receiver.

The receiver checks the channel status of the resource allocated to a random sub-carrier or a predetermined sub-carrier, sets a proper offset $N_{offset}$, and feeds back the set offset to the transmitter. Then, the transmitter applies the fed-back offset value $N_{offset}$ to the existing phase shift based precoding matrix for all sub-carriers regardless of types of sub-carriers (or index of sub-carriers) so that all sub-carriers move to the optimized channel area (area allocated for a dotted line sine wave). In other words, since the frequency domain having the greatest channel size is equally applied to all sub-carriers, system performance can be improved. An equation of the phase shift based precoding matrix to which the fed-back index offset $N_{offset}$ has been applied can be expressed as follows.

$$\frac{1}{\sqrt{4}} \begin{pmatrix} 1 & -e^{-j\theta_1 N_{offset}} \\ e^{j\theta_1 N_{offset}} & 1 \\ e^{j\theta_2 N_{offset}} & -e^{-j\theta_3 N_{offset}} \\ e^{j\theta_3 N_{offset}} & e^{-j\theta_2 N_{offset}} \end{pmatrix} \quad [\text{Equation 29}]$$

In this case, the sub-carrier index offset $N_{offset}$ is a fixed value, and serves as information for the greatest channel size at the receiver.

When Equation 29 is applied to the generalized phase shift diversity scheme, the following Equation 30 can be obtained.

$$P^k_{N_t \times R} = \begin{pmatrix} e^{j\theta_1 N_{offset}} & 0 & L & 0 \\ 0 & e^{j\theta_2 N_{offset}} & L & 0 \\ M & M & O & 0 \\ 0 & 0 & L & e^{j\theta_{N_t} N_{offset}} \end{pmatrix} U_{N_t \times R} \quad [\text{Equation 30}]$$

Also, when Equation 29 is applied to the expanded phase shift diversity scheme, the following Equation 31 can be obtained.

$$P^k_{N_t \times R} = \underbrace{\begin{pmatrix} e^{j\theta_1 N_{offset}} & 0 & L & 0 \\ 0 & e^{j\theta_2 N_{offset}} & L & 0 \\ M & M & O & 0 \\ 0 & 0 & 0 & e^{j\theta_{N_t} N_{offset}} \end{pmatrix}}_{D_1} \quad [\text{Equation 31}]$$

$$W_{N_t \times R} \underbrace{\begin{pmatrix} e^{j\theta'_1 k} & 0 & L & 0 \\ 0 & e^{j\theta'_2 k} & L & 0 \\ M & M & O & 0 \\ 0 & 0 & 0 & e^{j\theta'_R k} \end{pmatrix}}_{D_2}$$

In the second method of the present invention, if NACK signal is arrived from the receiver due to errors occurring in transmission packets, the existing phase shift based precoding matrix is changed to any one among the matrixes of the first to fourth feedback embodiments by using various kinds of offset information fed back from the receiver and then packet retransmission is performed using the changed precoding matrix. Hereinafter, the main configuration of the transmitting and receiving apparatus which supports the second method will be described.

Transmitting and receiving apparatus which supports second method

In this transmitting and receiving apparatus, an input module, a display module, a memory module, a wireless communication module, a speaker SP, a mike MIC, an audio processor, a controller, and a channel encoder, an interleaver, a mapper, a precoder, a subchannel modulator, an IFFT, a filter, and an analog converter which are included in the wireless communication module, and a precoding matrix determination module and a precoding module which are included in the precoder are the same as those of the transmitting and receiving apparatus which supports the first method. Accordingly, an offset application module (not shown) provided in the precoder instead of the precoding matrix reconstruction module will now be described.

The offset application module applies phase value offset information fed back from the receiver and/or sub-carrier index offset information to the precoding matrix reconstructed by the precoding matrix reconstruction module to finally complete any one among the matrixes of the first to fourth feedback embodiments if the transmitting and receiving apparatus of the present invention is operated in a closed loop system. If the transmitting and receiving apparatus of the present invention is operated in an open loop system, the offset application module applies phase value offset information and/or sub-carrier index offset information, which is randomly given from the transmitter.

Meanwhile, a personal digital assistant (PDA), a cellular phone, a personal communication service (PCS) phone, a global system for mobile (GSM) phone, a wideband CDMA (WCDMA) phone, or a mobile broadband system (MBS) phone may be used as the transmitting and receiving apparatus of the present invention.

According to the present invention, the multiple antenna related scheme is combined with the ARQ related scheme to simultaneously improve speed and reliability in data transmission. Also, the present invention can be applied to a frequency selective channel, allows error processing of a multiple codeword, and can apply adaptive ARQ without being limited to the specific multiple antenna transmission method.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to a wire communication system such as a wireless Internet and a mobile communication system.

What is claimed is:

1. A method for closed-loop spatial multiplexing (SM) transmission using multiple antennas in a wireless access system, the method comprising:
   selecting a first precoding matrix from a codebook;
   transmitting a first stream (S1) and a second stream (S2) based on the first precoding matrix for the closed-loop SM by using multiple antennas at a same time;
   receiving feedback information including a precoding matrix index (PMI) and a negative reception acknowledgement (NACK) for the transmission of the S1 and the S2; and
   re-transmitting the S1 and the S2 based on a second precoding matrix indicated by the PMI, wherein an input order of the S1 and the S2 to the second precoding matrix is reversed compared with the transmission of the S1 and the S2.

2. The method according to claim 1, wherein each of the first precoding matrix and the second precoding matrix is a phase shift based precoding matrix.

3. The method according to claim 1, wherein the first precoding matrix and the second precoding matrix are the same.

4. The method according to claim 1, wherein the second precoding matrix consists of at least one column of the first precoding matrix to reduce an SM rate.

5. An apparatus for closed-loop spatial multiplexing (SM) transmission using multiple antennas in a wireless access system, the apparatus comprising:
   the multiple antennas;
   a precoder; and
   a multiple-input multiple-output (MIMO) processor for supporting the closed-loop SM transmission;
   wherein the precoder is configured to:
      select a first precoding matrix from a codebook; and
   wherein the MIMO processor is configured to:
      transmit a first stream (S1) and a second stream (S2) based on the first precoding matrix for the closed-loop SM by using multiple antennas at a same time;
      receive feedback information including a precoding matrix index (PMI) and a negative reception acknowledgement (NACK) for the transmission of the S1 and the S2; and
      re-transmit the S1 and the S2 based on a second precoding matrix indicated by the PMI, wherein an input order of the S1 and the S2 to the second precoding matrix is reversed compared with the transmission of the S1 and the S2.

6. The apparatus according to claim 5, wherein each of the first precoding matrix and the second precoding matrix is a phase shift based precoding matrix.

7. The apparatus according to claim 5, wherein the first precoding matrix and the second precoding matrix are the same.

8. The apparatus according to claim 5, wherein the second precoding matrix consists of at least one column of the first precoding matrix to reduce an SM rate.

* * * * *